Jan. 31, 1967 B. J. WARMAN 3,301,960

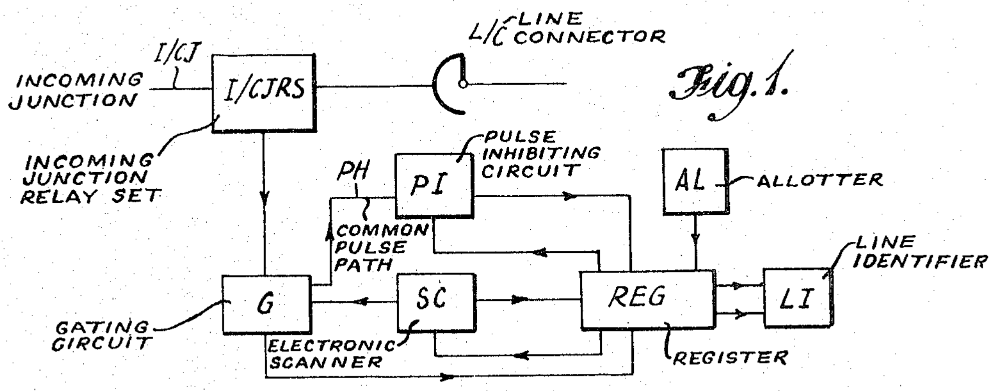
Fig. 1.
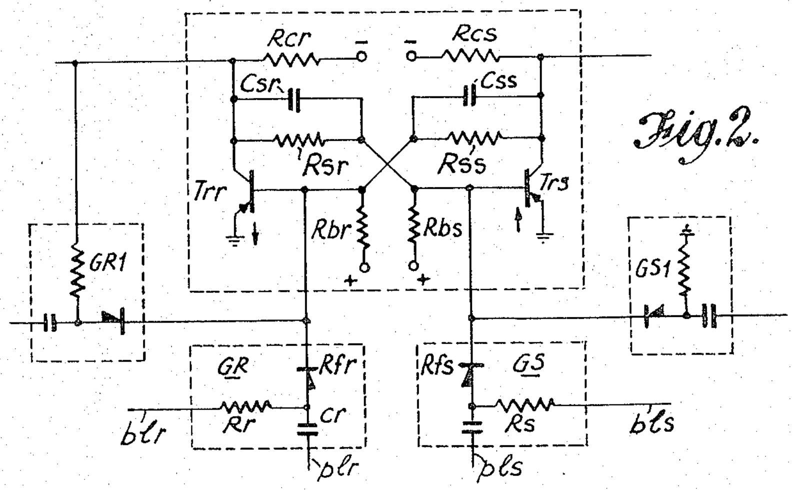
Fig. 2.
Fig. 18.
| | | | | | |
|---|---|---|---|---|---|
| | | FIG. 15. | FIG. 16. | FIG. 17. | FIG. 8. |
| FIG. 3. | FIG. 4. | FIG. 5 | FIG. 6. | FIG. 7. | FIG. 9. |
| | FIG. 10 | FIG. 11 | FIG. 12. | FIG. 13. | FIG. 14. |

AUTOMATIC TELEPHONE EXCHANGE SYSTEMS

Filed Dec. 13, 1962 29 Sheets-Sheet 3

Jan. 31, 1967 B. J. WARMAN 3,301,960

AUTOMATIC TELEPHONE EXCHANGE SYSTEMS

Filed Dec. 13, 1962 29 Sheets-Sheet 10

Jan. 31, 1967 B. J. WARMAN 3,301,960

AUTOMATIC TELEPHONE EXCHANGE SYSTEMS

Filed Dec. 13, 1962 29 Sheets-Sheet 11

Jan. 31, 1967 B. J. WARMAN 3,301,960

AUTOMATIC TELEPHONE EXCHANGE SYSTEMS

Filed Dec. 13, 1962 29 Sheets-Sheet 15

Jan. 31, 1967 B. J. WARMAN 3,301,960

AUTOMATIC TELEPHONE EXCHANGE SYSTEMS

Filed Dec. 13, 1962 29 Sheets-Sheet 18

Jan. 31, 1967 B. J. WARMAN 3,301,960

AUTOMATIC TELEPHONE EXCHANGE SYSTEMS

Filed Dec. 13, 1962 29 Sheets-Sheet 22

Fig. 17(a.)
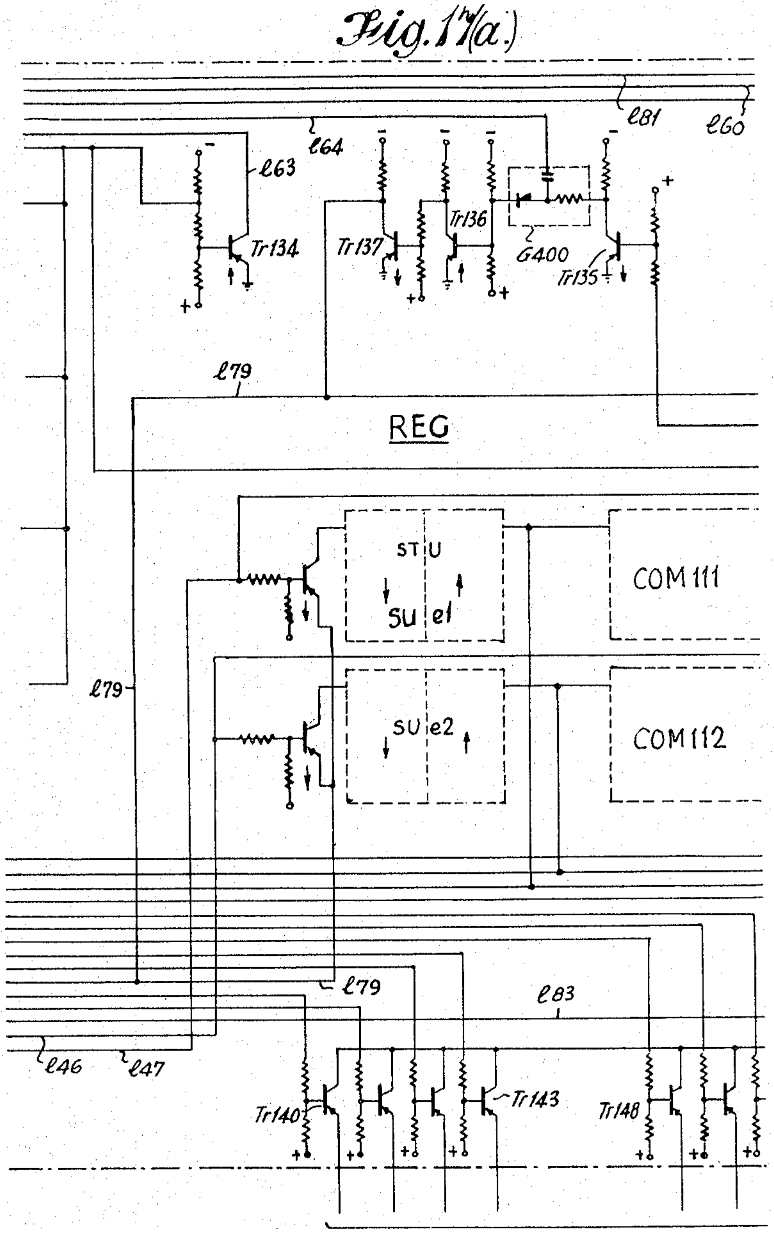

Fig. 17(b.)
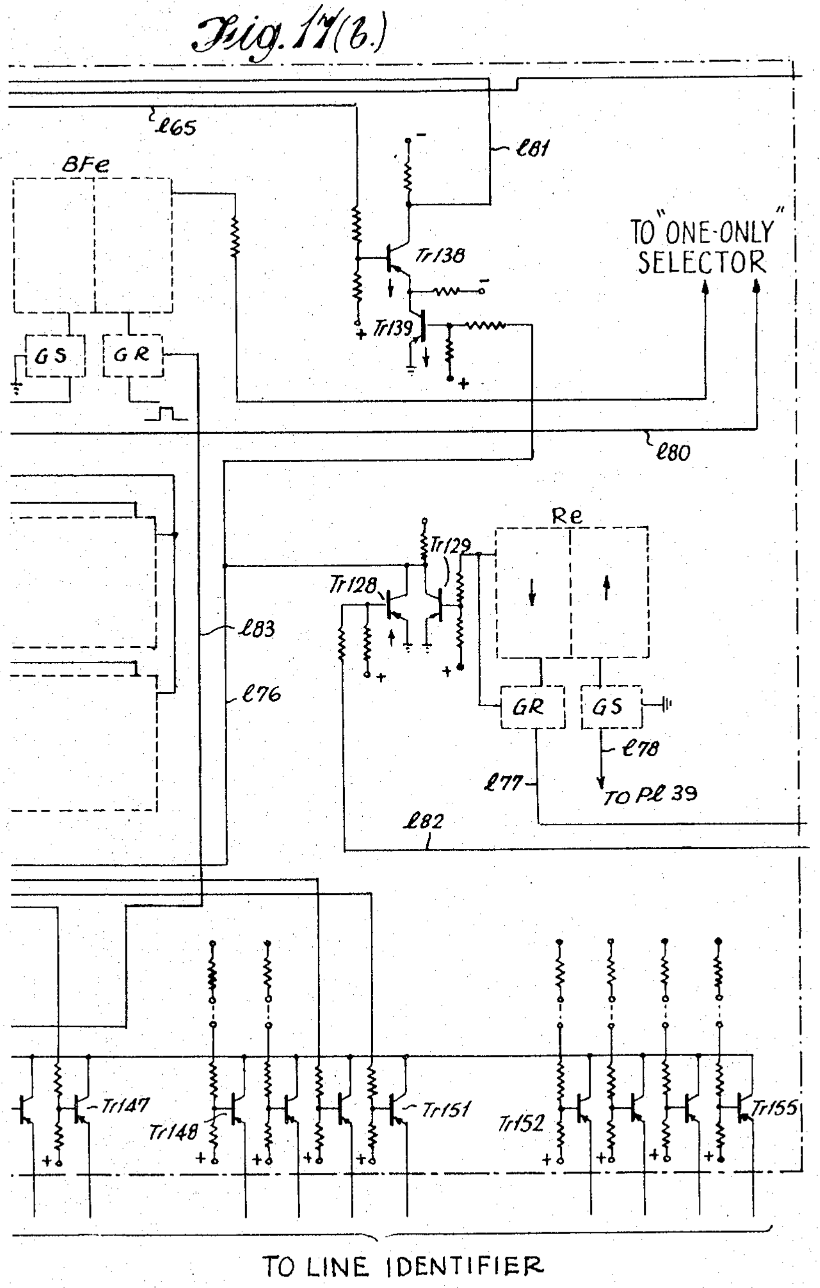

3,301,960
AUTOMATIC TELEPHONE EXCHANGE SYSTEMS

Bloomfield James Warman, London, England, assignor to Associated Electrical Industries Limited, London, England, a British company Filed Dec. 13, 1962, Ser. No. 244,333
Claims priority, application Great Britain, Jan. 2, 1962, 166/62
10 Claims. (Cl. 179—18)

This invention relates to automatic telephone exchange systems.

In an automatic telephone exchange, the lines connected to the exchange usually comprise, in addition to subscribers' lines, a number of incoming junctions which are terminated at the exchange on incoming junction relay sets individual to the incoming junctions.

Upon the initiation of a call by a local subscriber served by the exchange, dial tone may be returned to the calling subscriber once the calling line has been afforded access to a register over some form of dial path coupling, whereupon the calling subscriber can dial the called line's number into the register. Thus, the speed of coupling of the register to the calling subscriber's line is not of paramount importance and in fact a saving in the total number of registers can be achieved if an extended time delay can be tolerated between the initiation of the call and the return of dial tone to the calling subscriber. With an incoming junction call, however, the call will have been routed to the exchange from a distant exchange under the control of one or more digits already dialled by the calling subscriber so that very rapid coupling of a free register to the calling incoming junction will be necessary if the subsequent digits to be dialled by the calling subscriber for identifying the called line's number are to be received and stored by the register, more especially having regard to the fact that a substantial part of the dialling inter-digit pause will already have elapsed in searching for and finding the particular outgoing junction (corresponding to the calling incoming junction at the exchange under consideration) at the distant exchange.

This problem of affording very rapid coupling between registers and calling incoming junctions may be alleviated to some extent by arranging that the incoming junction relay sets terminating individual incoming junctions each include, in addition to the usual impulsing and cut-off relays, a digit storage element, for example a uniselector, for temporarily storing the first dialled digit to be received over the calling incoming junction during the time that a free register is being coupled up to the calling incoming junction and by arranging that the switching time of electromechanical switches for coupling registers to calling incoming junctions is reduced as much as possible. The provision of such temporary storage elements in incoming junction relay sets is costly, however, and, in any case, the storing of the first received digit only over a calling incoming junction on the storage element of the appropriate incoming junction relay set may not provide sufficient time for a register to be coupled up to the calling incoming junction.

According to one feature of the present invention, there is provided an automatic telephone exchange system of the kind in which the lines connected to an exchange include incoming junctions terminated on incoming junction relay sets individual to said junctions and in which registers are provided to which access can be afforded to calling incoming junctions for the purpose of storing the identities of calling incoming junctions and called lines' numbers, comprising electronic scanning means for feeding scanning pulses in succession to gating circuits associated, respectively, with said incoming junctions and effective to permit the passage of said scanning pulses to a common pulse path in the looped condition of their respective incoming junctions, initially for the seizure of a free register which registers the identity of the appertaining calling incoming junction and, thereafter, for the supervision and counting in the seized register of dialled impulses received over the calling incoming junction for registering the called line's identity in said seized register.

According to another feature of the present invention, there is provided an automatic telephone exchange system, in which the lines connected to an exchange include incoming junctions terminated on incoming junction relay sets which are individual to said junctions and registers being provided to which access can be afforded to calling incoming junctions for the purpose of storing the identities of calling incoming junctions and called lines' numbers, said exchange system comprising electronic scanning means for feeding scanning pulses in succession to gating circuits associated, respectively, with incoming junctions and effective to permit the passage therethrough of the scanning pulses to bring about the transmission of signals such as pulses to a common pulse path in the looped condition of their appertaining incoming junctions, initially for the seizure of a free register which registers the identity of the appertaining calling incoming junction and, subsequently, for the supervision and counting in the seized register of dialled impulses received over the calling incoming junction for registering the called line's identity in the seized register, in which the identity of an incoming junction associated with a gating circuit being scanned at a given instant by the electronic scanning means is extended by said scanning means to said registers in common and is compared by the registers with the identity of any incoming junction already stored therein, any response of a register as a result of the comparison determining whether a register has already been taken into use for dealing with the initiation of a call on the appertaining incoming junction.

The scanning pulses fed by the electronic scanning means to the gating circuits may serve both for detecting the initiation of incoming junction calls as well as for the supervision of dialling on calling incoming junctions if the scanning speed of the electronic scanning means is sufficiently fast. However, since the number of registers to which access can be gained by incoming junctions will be considerably less than the total number of incoming junctions, and bearing in mind that for the purpose of counting and storing dialled impulses over calling incoming junctions, it is only necessary to supervise those incoming junctions that have already taken registers into use, it is preferred to scan the registers rather than all of the gating circuits individual to the incoming junctions for the supervision of dialling on calling incoming junctions. In this way, the required scanning speed can be appreciably reduced according as the relative numbers of incoming junctions and registers. In this way, a previously seized register as it is scanned by pulses from the electronic scanning means identifies to the electronic scanning means the identity of the particular calling incoming junction to which the register has been afforded access. It may be arranged for example that between successive scanning pulses fed by the electronic scanning means to the gating circuits, one of the registers is scanned by the scanning means (the registers being scanned in turn between successive pairs of scanning pulses) to cause that register, if it has already been seized in the manner aforesaid, to feed the identity of the calling incoming junction that it has stored within it to the electronic scanning means, whereupon a pulse will be fed to the appertaining gating circuit which will permit the passage of this pulse therethrough towards the register or inhibit the passage of such pulse according to whether the line wires of the calling incoming junction are looped or disconnected at this instant. The successive pulses fed to this gating circuit associated with the calling incoming junction responsively to the successive interrogation or pulse scanning of the register taken into use for the call may thus be utilised for detecting dialled impulses received over the calling incoming junction and for the transmission of representative pulses to the register for counting and storing purposes. The common pulse path of the system may extend to a pulse inhibit circuit providing on the outgoing side thereof dual paths leading in common to the registers. A free register can be seized by a pulse received over one of said dual paths from the outgoing side of the pulse inhibit circuit in response to scanning of the gating circuits in turn by the electronic scanning means for detecting the initiation of incoming junction calls, whereas pulses can be delivered to seized registers over the other of said dual paths during scanning of the gating circuits for the purposes of supervising dialling on incoming junctions and the counting and storing in the register of dialled impulses.

The scanning sequence of the electronic scanning means will be under the control of a sequence counter and this will be arranged so that the time period between successive pulses fed to the gating circuits of incoming junctions for the supervision of dialling is less than that of a dial impulse which may, for example, have a duration of 33 milliseconds.

By way of example the present invention will now be described with reference to the accompanying drawings, in which:

FIG. 1 is a block schematic diagram showing various parts of an automatic telephone exchange embodying the invention;

FIGS. 2 to 17 show various detail circuits shown in block form in FIG. 1; and,

FIG. 18 shows the physical arrangement of FIGS. 3 to 17.

Figure 3A:
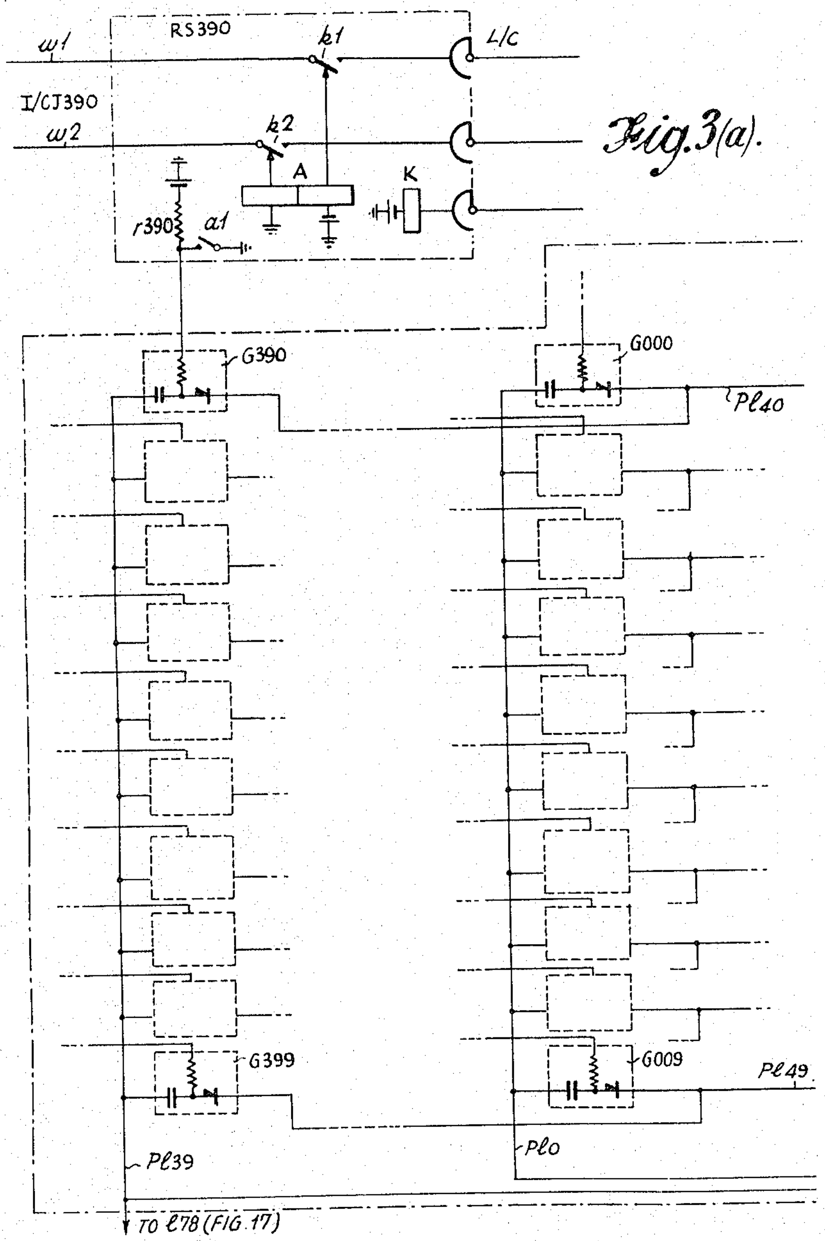

Referring to FIG. 1 of the drawings, the lines connected to the exchange include a number of incoming junctions, one of which is indicated at I/CJ having line wires *w*1, *w*2 (FIG. 3), which are terminated, respectively, on incoming junction relay sets, such as junction relay set I/CJRS, connected to the outlets of line connectors, for example line connector L/C in FIG. 1. For the sake of description, it may be assumed for example that the automatic telephone exchange under consideration serves 10,000 lines including 400 incoming junctions from distant exchanges. These lines served by the exchange may be arranged in groups, hereinafter referred to as line-groups, with the lines of the line-groups being connected to the outlets of line connector groups. Each line connector group may serve 100 lines including 4 incoming junctions so that 100 line connector groups will be provided for serving 10,000 lines including 400 incoming junctions.

Each of the incoming junction relay sets, such as junction relay set I/CJRS, has associated with it a gating circuit, such as gating circuit G shown in FIG. 1, arranged to be opened when the line wires of its associated incoming junction are looped. There will be 400 gating circuits in all and these gating circuits, such as gating circuit G, are arranged to be scanned sequentially by an electronic scanner SC common to all of the incoming junction. This electronic scanner SC scans the gating circuits in succession in order to determine whether or not the gating circuit being scanned is open, thereby signifying the looped (calling) condition of its associated incoming junction. In scanning, the electronic scanner SC feeds a scanning pulse to each of the gating circuits in turn and this pulse gives rise to a pulse on a common pulse path PH if the gating circuit in question is open. The pulse on the pulse path PH will be extended through a pulse inhibiting circuit PI to a number of registers, such as register REG, if opening of the gating circuit is due to initial looping of the appertaining incoming junction upon the initiation of an incoming call. One of these registers, such as register REG, will have already been selected by a register allotter AL, such as a one-only selector, for dealing with the call initiated on the incoming junction. The pulse extended through the pulse inhibiting circuit PI causes the selected register to be seized. The electronic scanner SC by this time has extended a marking to all the registers in common for signifying the identity of the particular gating circuit being scanned and thus the identity of the calling junction and the identity of this gating circuit pertaining to the calling incoming junction will be recorded in storage elements in the register which has been seized by the pulse extended through the pulse inhibiting circuit PI. Once the register has stored the identity of the gating circuit, the extension of a further pulse through the pulse inhibiting circuit PI for the seizure of another register upon the scanning of the gating circuit for the second time is prevented by the pulse inhibiting circuit PI which receives a signal from the register after the identity of the gating circuit has been stored.

The electronic scanner SC as it delivers a scanning pulse to a gating circuit also delivers a pulse to one of the registers, such as register REG, to cause this register to extend to the scanner the identity of any gating circuit that is stored in the register. In extending any stored gating circuit identity to the electronic scanner SC a scanning pulse is applied to this gating circuit and will appear on the common pulse path if the calling incoming junction to which the gating circuit pertains is looped. If this calling incoming junction is disconnected due to break dialled impulses, then a pulse will not appear on the common pulse path and the presence or absence of the pulse on the pulse path will be detected by appropriate elements in the register concerned. By arranging that the electronic scanner SC scans each of the registers in turn dialling on calling incoming junctions for which the registers have been taken into use can be supervised and information in pulse form corresponding to dialled impulses fed into the register for counting and storing and subsequent onward transmission to a line identifier LI for identifying the called line's number when the latter becomes coupled-up to the register. The line identifier LI will also have the calling line's number identified to it from the register and the call will be established through various switching stages in accordance with the information passed to the line identifier concerning the identities of the calling and called lines' numbers.

Figure 6A:
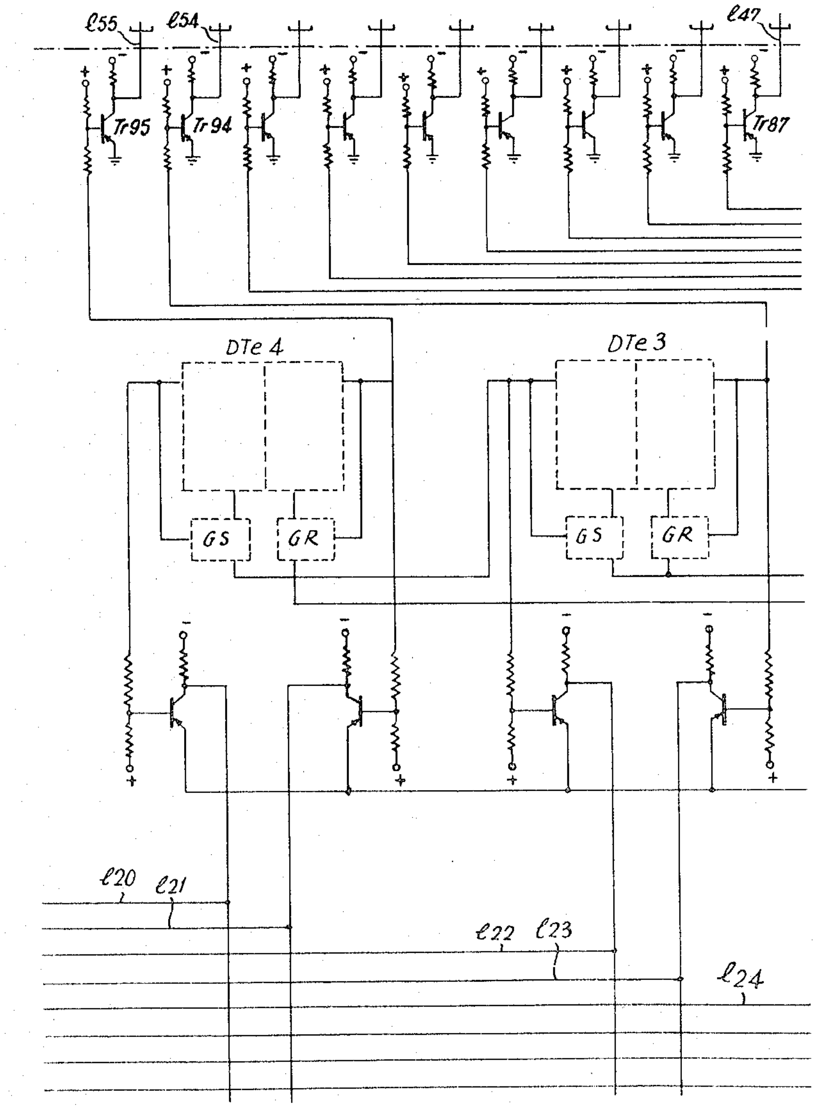
Figure 6B:
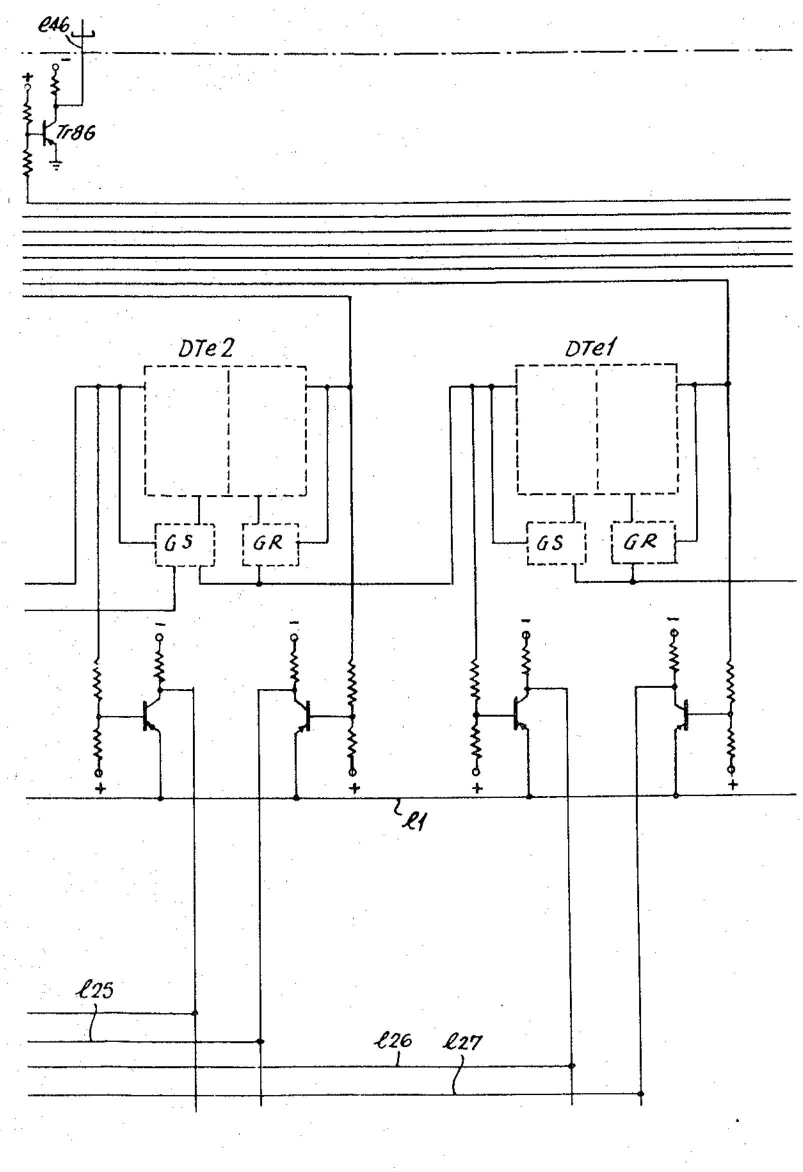

The electronic scanner SC and the registers, such as register REG, each include bistable transistor circuits, such as represented by the dotted line block DT*e*1 in FIG. 6 to be described later. These bistable transistor circuits, all of which bear the suffix *e*, are exemplified by the circuit shown in FIG. 2 to which reference will now be made in order to consider the detail operation of the bistable circuit prior to the description of the overall circuit operation.

Figure 2B:
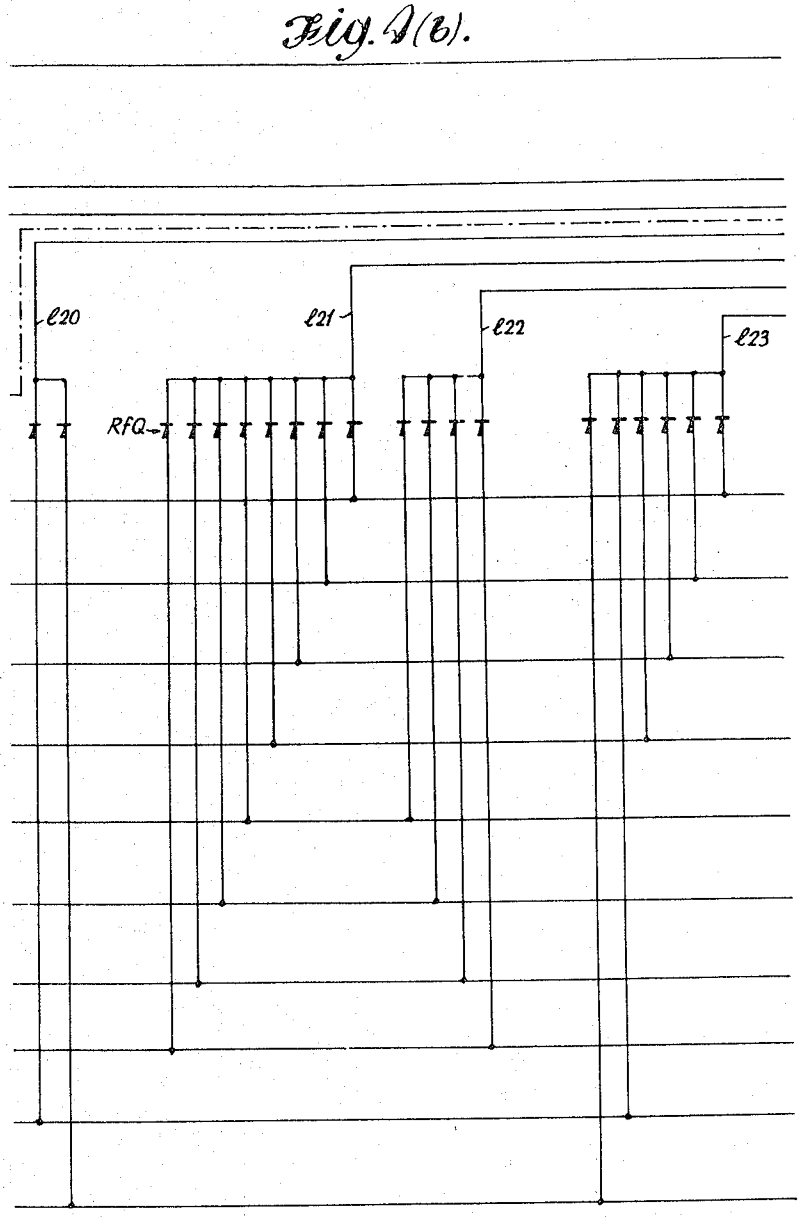
Figure 5A:
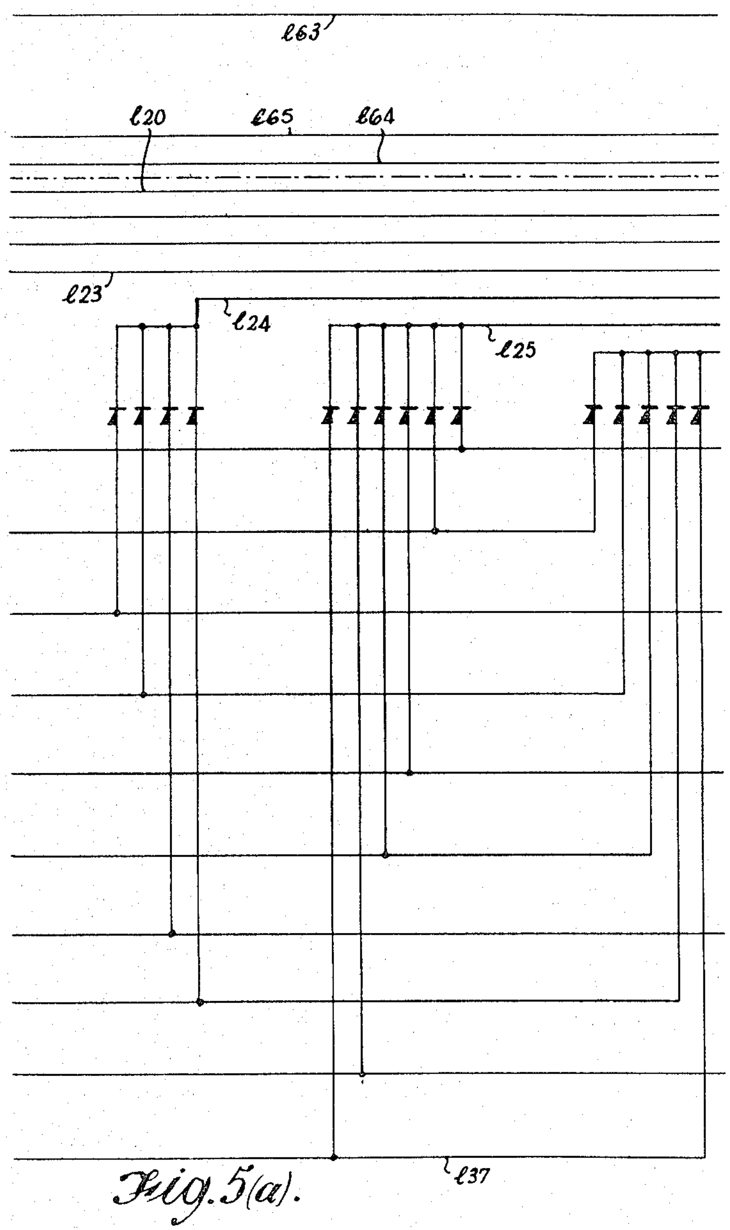
Figure 5B:
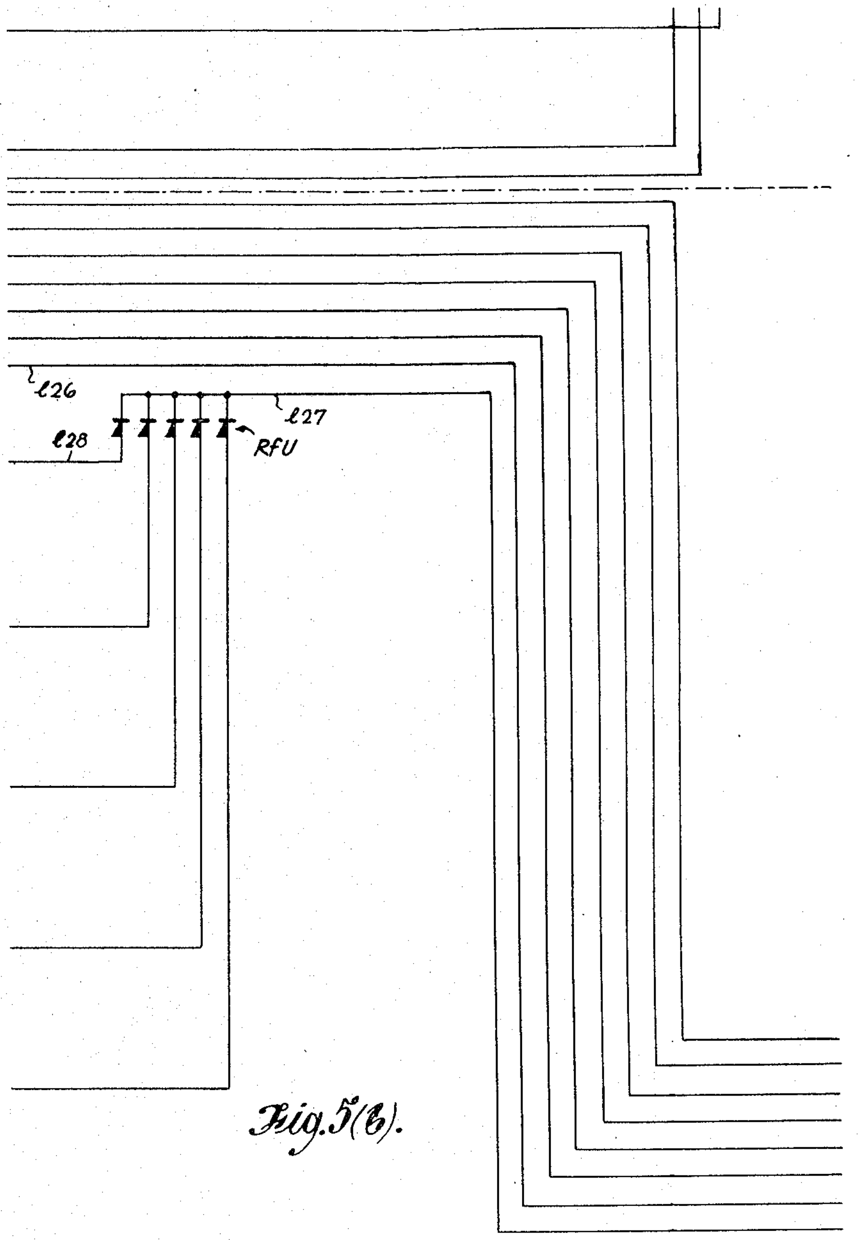

Referring then to FIG. 2 of the drawings, two transistors T*rr* and T*rs* have their respective collectors and bases cross-coupled through capacitors C*sr* and C*ss* in parallel with resistors R*sr* and R*ss*. The collectors of the transistors T*rr* and T*rs* are also connected through respective collector resistors R*cr* and R*cs* to negative supply terminals (−) while their bases are also connected through respective bias resistors R*br* and R*bs* to position reference potential terminals (+). The emitters of the two transistors are connected directly to earth potential. With the left-hand transistor T*rr* for example in a substantially non-conducting state (this being indicated by the downward pointing arrow adjacent this transistor) its resulting negative collector potential biases the base of the right-hand transistor T*rs* negative through the parallel combination of the capacitor C*sr* and resistor R*sr* so that this latter transistor is fully conducting (this being indicated by the upward pointing arrow adjacent this transistor). A positive signal applied to the base of the right-hand transistor T*rs* raises the base potential of this transistor thereby tending to reduce its conduction. The consequent negative-going change of potential on the collector of the right-hand transistor T*rs* is transferred via the parallel combination of capacitor C*ss* and resistor R*ss* to bias the base of the left-hand transistor T*rr* negative, thereby tending to render this transistor conducting with a consequent rise in its collector potential which is transferred via the parallel combination of capacitor C*sr* and resistor R*sr* to bias the base of the right-hand transistor T*rs* more positive and thereby tend to further reduce the conduction of this latter transistor. This regenerative action continues until the left-hand transistor T*rr* becomes fully conducting and the right-hand transistor T*rs* becomes substantially non-conducting. Upon the application of a further positive signal to the base of the left-hand transistor T*rr* a similar operation to that just above described will take place in reverse, resulting in the right-hand transistor T*rs* becoming fully conducting again and the left-hand transistor T*rr* becoming substantially non-conducting. It is evident that a positive signal applied to the base of the non-conducting transistor in the bistable circuit is ineffective in changing the conducting states of the two transistors.

Hereinafter, the normal state of a bistable circuit as indicated by the arrows adjacent its transistors will be called the reset state, while its operated state, in which the state of conduction of the transistors is reversed, will be called the set state.

Associated with the bistable circuit shown in FIG. 2 is an individual so-called pulse-plus-bias setting input gate GS which comprises a pulse input capacitor C*s*, a bias input resistor R*s* and an output rectifier R*fs* all connected to a common point within the gate. Externally of the setting gate GS, capacitor C*s*, is connected to a pulse lead *pls*, the resistor Rs is connected to a bias lead *bls* and the output rectifier R*fs* is connected to and is poled to conduct towards the base of the right-hand transistor T*rs*. With these connections the gate is closed by applying a suitable negative potential to the bias leads *bls* to back off the rectifier R*fs* sufficiently to prevent it passing positive pulses applied to pulse leads *pls*, and is opened by replacing the negative potential on *bls* by a more positive (earth) potential to forward bias the rectifier R*fs* so that it passes positive pulses applied over lead *pls*. An individual pulse-plus-bias re-setting gate GR is also associated with the bistable circuit. This gate similarly comprises a pulse input capacitor C*r*, a bias input resistor R*r* and an output rectifier R*fr* and operates in the same fashion as the gate GS in response to a positive signal applied to capacitor C*r* over a pulse lead *plr* and with a bias lead *blr* held at a suitable potential, but in respect of the re-setting of the bistable circuit.

Figure 3B:
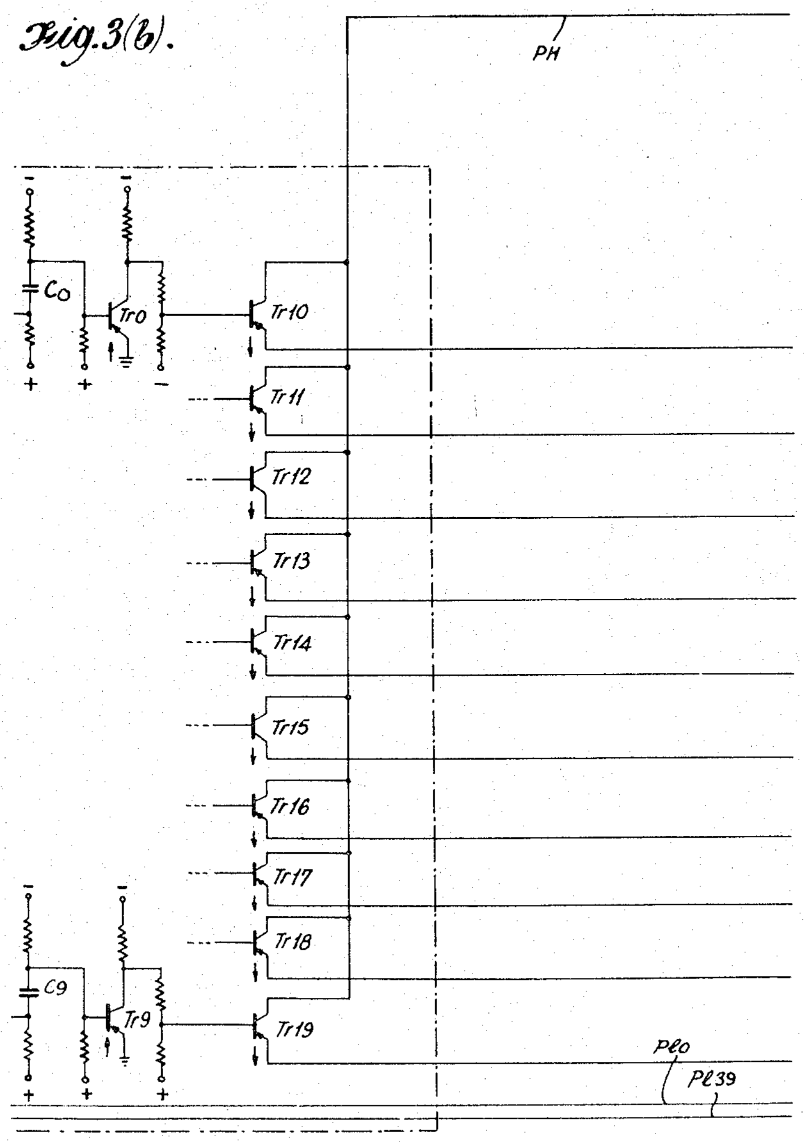

Turning now to FIG. 3 of the drawings, this shows an incoming junction I/CJ390 having line wires *w*1 and *w*2 terminated at an incoming junction relay set RS390 comprising a double winding impulsing relay A which is connected across the line wires *w*1 and *w*2 through back contacts of contacts *k*1 and *k*2 of a cut-off relay K. The relay set is connected on its outgoing side to bank contacts of a motor uniselector line connector L/C, being one of a group of such line connectors having the lines from the relay set multipled over their contact banks. The junction relay set RS390, with the impulsing relay A unoperated, extends negative battery via a resistor *r*390 to the bias input of a pulse-plus-bias gate G390 so that the gate is closed. The incoming junction relay sets (not shown) associated with the other incoming junctions also extend negative battery to the bias inputs of their associated pulse-plus-bias gates, namely gates G000 to G389 and G391 to G399, as just above described for the junction relay set RS390. The exchange under consideration is equipped with 400 pulse-plus-bias gates individually associated with the incoming junctions, such as junction I/CJ390. These pulse-plus-bias gates designated G000 to G399 are arranged as regards their pulse inputs in 40 groups of 10 gates each, with the pulse inputs of each group of 10 gates being commoned together as shown in FIG. 3 for the two groups of gates G000 to G009 and G390 to G399. As regards the pulse outputs of the gates G000 to G399, the gates are arranged in 10 groups of 40 gates each, with the pulse outputs of each group of 40 gates being commoned together. Thus, it will be seen that the 400 pulse-plus-bias gates G000 to G399 are arranged to have 40 pulse inputs each of which is common to a group of 10 gates and 10 pulse outputs each of which is common to a group of 40 gates.

As mentioned above the incoming junction relay sets, such as relay set RS390, extend negative potential to the bias inputs of the associated gates in the unoperated condition of the impulsing relays, such as relay A, to close the gates. However, in response to the operation of the impulsing relays, such as relay A, consequent upon the looping of the associated incoming junctions, the gates are opened by the application of earth potential to their bias inputs over operated contacts, such as contact *a*1, of the impulsing relays. Thus, the gate G390 will be opened by the looping of the line wires *w*1 and *w*2 of the incoming junction I/CJ390.

Pulse input leads, such as input leads *pl*0 and *pl*39, each of which is common to the pulse inputs of 10 pulse-plus-bias gates, such as gates G000 to G009, are connected, respectively to 40 output terminals *t*0 (FIG. 10) of an electronic scanner circuit SC shown in FIGS. 4 to 14 inclusive. Pulse output leads, such as leads *pl*40 and *pl*49, each of which is common to the pulse outputs of 40 pulse-plus-bias gates, such as gates G000, G010 . . . G390, are connected, respectively, via capacitors, such as capacitors C0 and C9, to the bases of 10 normally conducting transistors, such as transistors T*r*0 and T*r*9. The collectors of these 10 normally conducting transistors are connected to the bases of respective normally non-conducting transistors T*r*10 to T*r*19, the collectors of transistors T*r*10 to T*r*19 being connected in common to a pulse path PH and the emitters of these transistors being connected, respectively, to 10 output terminals *t*0' (FIG. 4) of the electronic scanner circuit SC.

Figure 9:
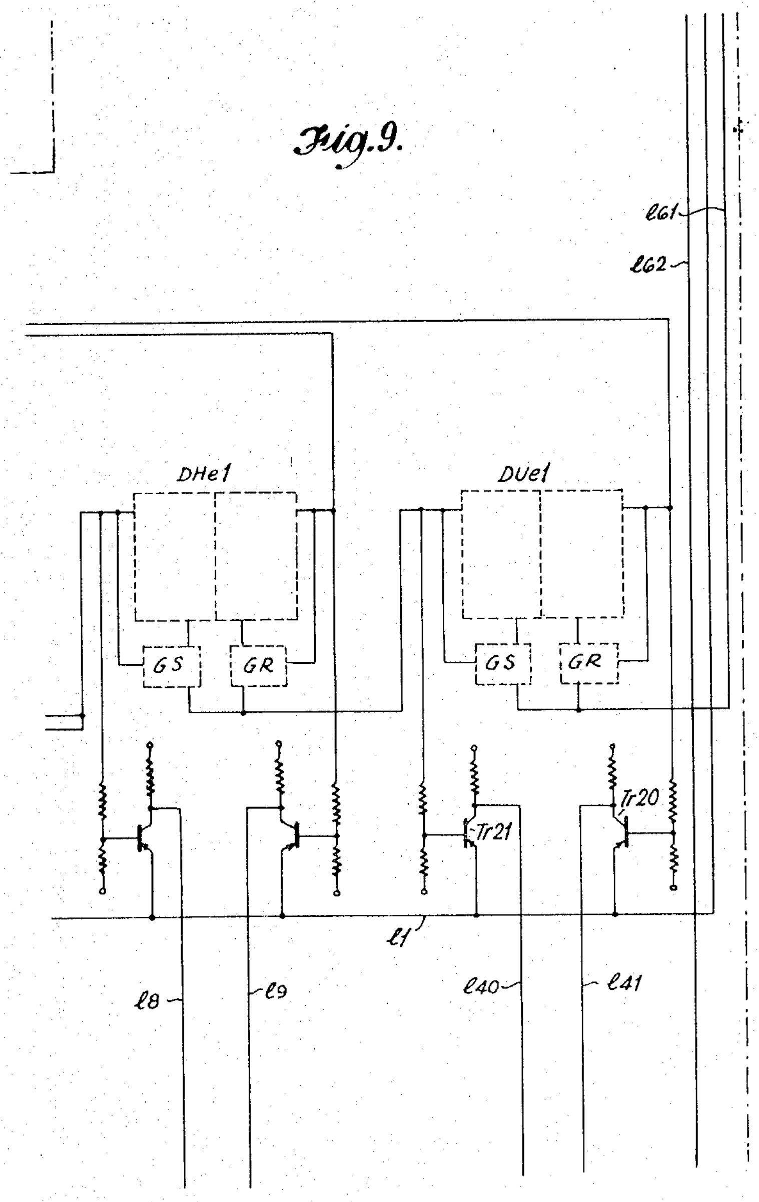
Figure 10A:
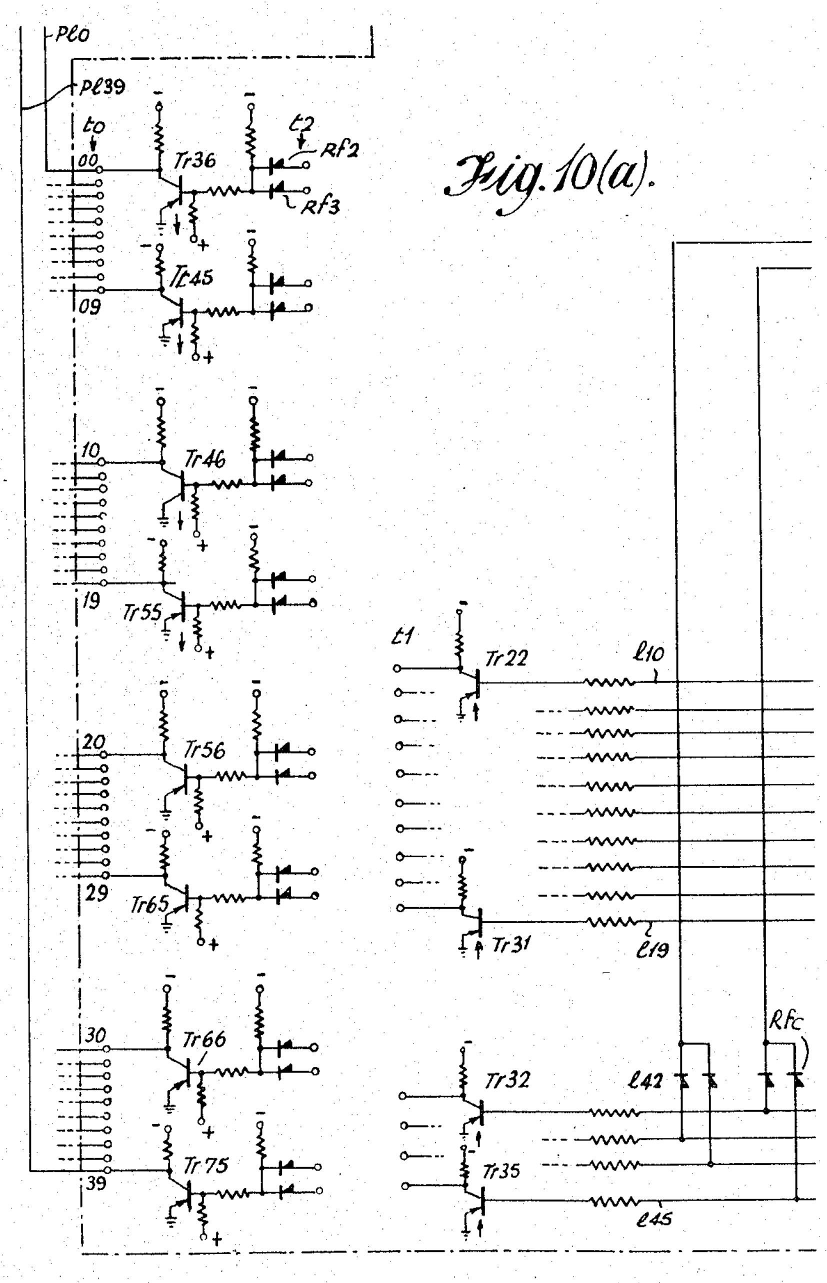
Figure 10B:
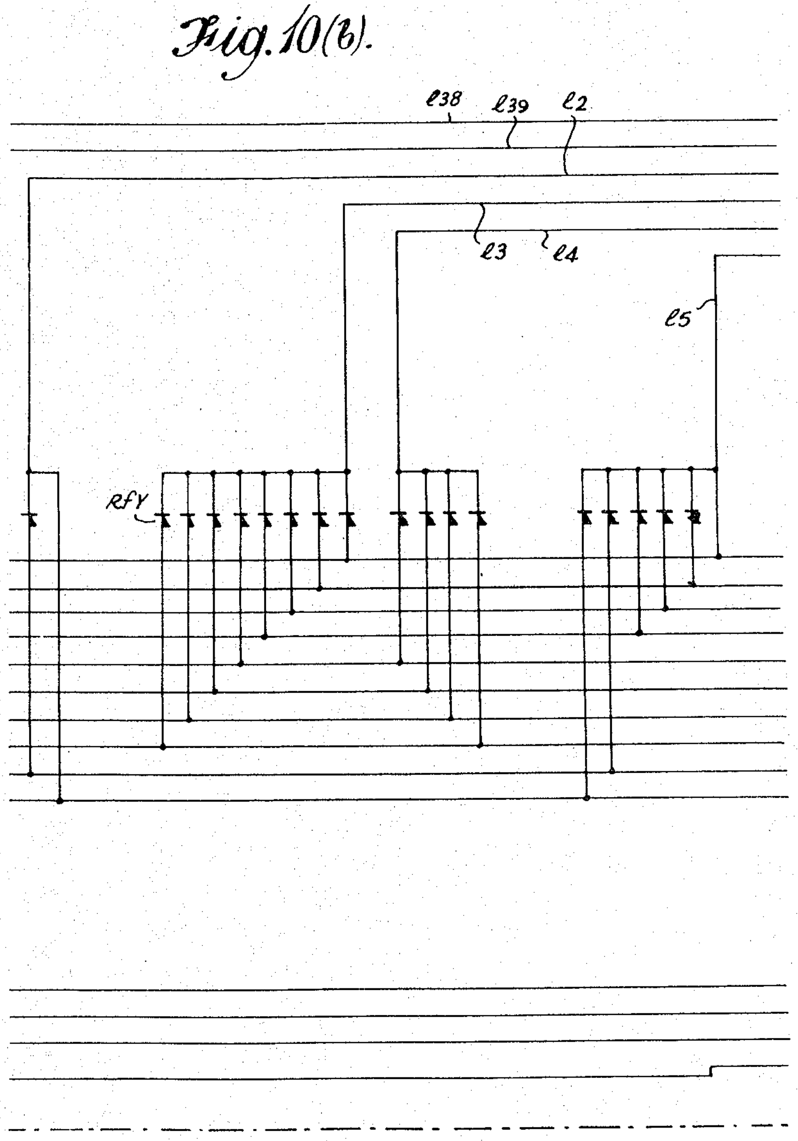
Figure 11A:
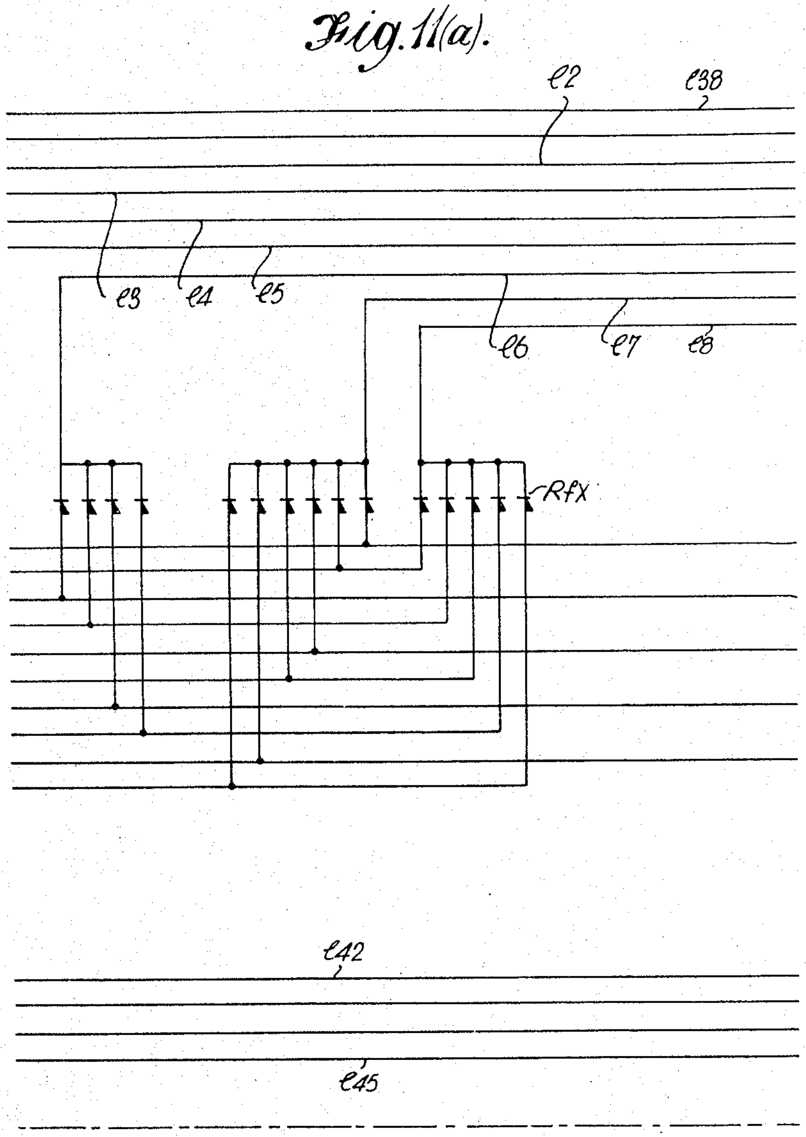
Figure 11B:
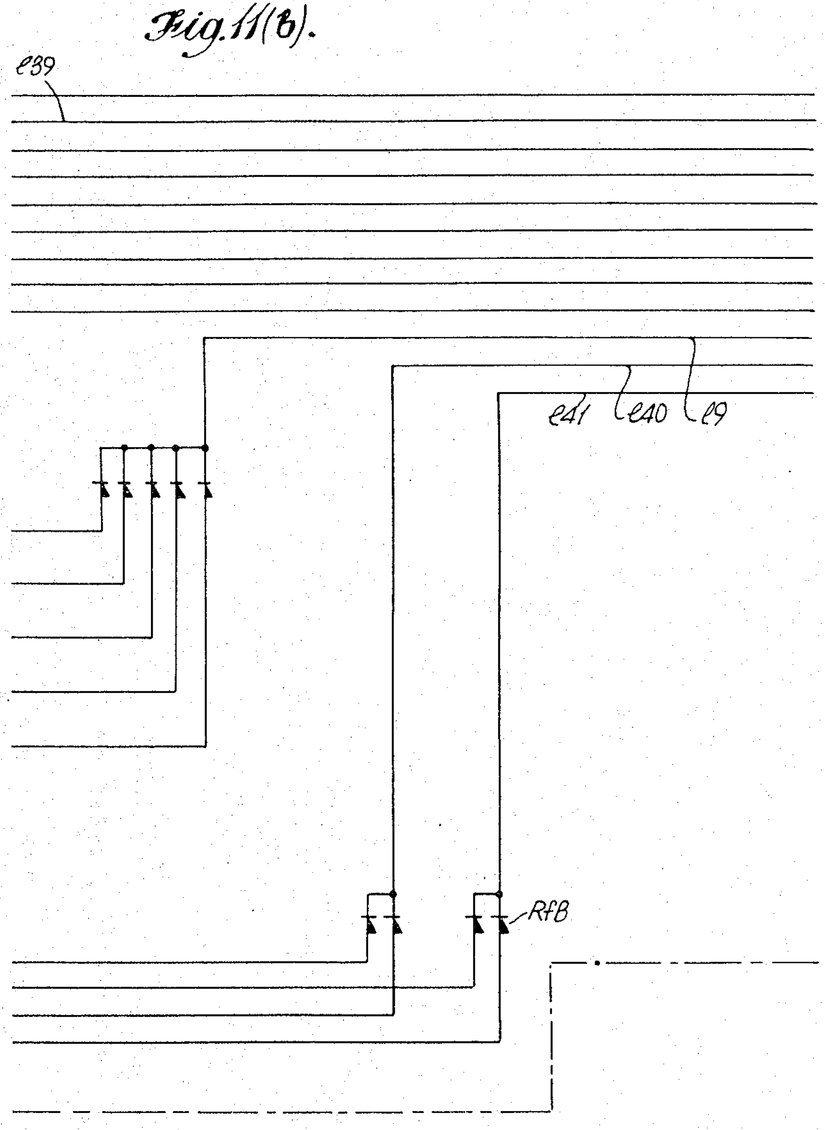

Considering now the electronic scanner SC, this includes two counters comprising, respectively, 4 transistor bistable circuits DH*e*1 to DH*e*4 (FIGS. 7 and 9) and DT*e*1 to DT*e*4 (FIG. 6), each of these bistable circuits having setting and re-setting gates GS and GR associated with it. Each of these counters comprising 4 bistable circuits would normally have a natural count of sixteen, but the counter is modified to provide a count of ten by the connection of a rectifier, such as rectifier R*f*1 (FIG. 7) between the collector of the left-hand transistor of the last bistable circuit of the counter, such as bistable circuit DH*e*4, and the junction between the bias input resistor and the pulse input capacitor of the setting gate GS of the second bistable circuit of the counter, such as bistable circuit DH*e*2. The bistable circuit DH*e*1 is arranged to receive setting and re-setting pulses at the commoned pulse inputs of its gates GS and GR from the collector of the left-hand transistor of a bistable circuit DU*e*1 (FIG. 9) having setting and resetting gates GS and GR and arranged for receiving setting and re-setting pulses from a sequence counter (FIG. 8) to be described later. The bistable circuit DT*e*1 receives setting and re-setting pulses from the collector of the left-hand transistor of a bistable circuit DU*e*2 (FIG. 7) having setting and re-setting gates GS and GR, the commoned pulse inputs of which are arranged for receiving setting and re-setting pulses from the collector of the left-hand transistor of the bistable circuit DH*e*4. The two transistor bistable circuits DU*e*1 and DU*e*2 provide between them a count of four while the two counters comprising bistable circuits DH*e*1 to DH*e*4 and DT*e*1 to DT$e$4 each provide a count of ten so that the 10 bistable circuits between them can provide a composite count of four hundred. Each of these 10 bistable circuits has a pair of gating transistors, such as transistors T$r$20 and T$r$21 associated with it, the bases of these gating transistors being connected, respectively, to the collectors of the right-hand and left-hand transistors of the appertaining bistable circuit, such as bistable circuit DU$e$1, in the case of transistors T$r$20 and T$r$21. These gating transistors, such as transistors T$r$20 and T$r$21, have their emitters connected in common to a lead $l$1 extending to the sequence counter (FIG. 8) to be described later. It may suffice here to say that the gating transistors can be primed by an earth pulse fed to the emitters of the transistors over the lead $l$1 from the sequence counter following each step of the composite counter. The collectors of the gating transistors associated with the transistor bistable circuits DH$e$1 to DH$e$4 are connected, respectively, to leads $l$2 to $l$9 which are connected to various combinations of leads $l$10 to $l$19 (FIG. 10) via individual rectifiers of groups of rectifiers, such as the rectifier groups R$f$X (FIG. 11) and R$f$Y (FIG. 10). The gating transistors which are associated with the bistable circuits DT$e$1 to DT$e$4 have their collectors connected, respectively, to leads $l$20 to $l$27 which are connected to various combinations of leads $l$28 to $l$37 via individual rectifiers of groups of rectifiers, such as rectifier groups R$f$U (FIG. 5) and R$f$Q (FIG. 4), while those gating transistors associated with the bistable circuits DU$e$1 and DU$e$2 have their collectors connected, respectively, to leads $l$38 to $l$41 (FIGS. 13 and 14) which are connected to combinations of leads $l$42 to $l$45 (FIG. 10) via individual groups of rectifiers, such as rectifier groups R$f$B (FIG. 11) and R$f$C (FIG. 10).

The leads $l$10 to $l$19 associated with the counter comprising bistable circuits DH$e$1 to DH$e$4 are connected to the bases of normally conducting transistors T$r$22 to T$r$31, respectively, while the leads $l$42 to $l$45 associated with the binary counter DU$e$1 and DU$e$2 are connected, respectively, to the bases of normally conducting transistors T$r$32 to T$r$35. The collectors of these transistors T$r$22 to T$r$31 and T$r$32 to T$r$35 are connected to terminals t1 (FIG. 10) which are inter-connected by strappings (not shown) to terminals $t$2 (FIG. 10). Terminals $t$2 are arranged in pairs which are connected via rectifiers, such as rectifiers R$f$2 and R$f$3, to the bases of normally non-conducting transistors shown in four groups of ten, namely transistors T$r$36 to T$r$45, transistors T$r$46 to T$r$55, transistors T$r$56 to T$r$65 and transistors T$r$66 to T$r$75. The collectors of the transistors T$r$36 to T$r$75 are connected, respectively, to the output terminals $t$0 to which the forty pulse input leads, such as the leads $pl$0 to $pl$39 (FIG. 3) are connected. Thus, it will be appreciated that the counting actions of the decade counter comprising the bistable circuits DH$e$1 to DH$e$4 and the binary counter constituted by the two bistable circuits DU$e$1 and DU$e$2 will, in effect, be combined over the strappings between the terminals $t$1 and $t$2 to provide a total count of forty, thereby producing an output pulse on each of the forty terminals $t$0 in turn for one complete counting cycle of the two counters in question.

The leads $l$28 to $l$37 (FIG. 4) are connected to the bases of normally conducting transistors T$r$76 to T$r$85 and the collectors of these transistors are connected, respectively, to the bases of normally non-conducting transistors T$r$110 to T$r$119. The transistors T$r$76 to T$r$85 are under the control of the decade counter formed by the transistor bistable circuits DT$e$1 to DT$e$4 and one of the transistors T$r$76 to T$r$85 will be cut off for each counting position of the counter. Thus in each counting position of this counter, one of the transistors T$r$10 to T$r$19 will be primed.

Figure 7A:
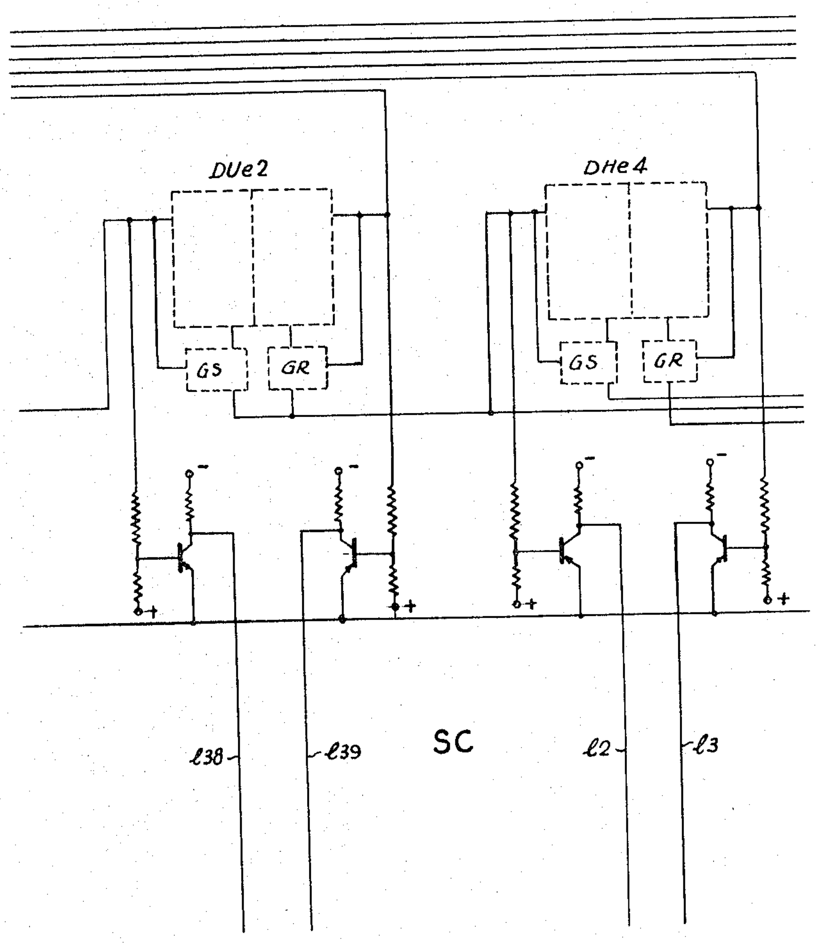
Figure 7B:
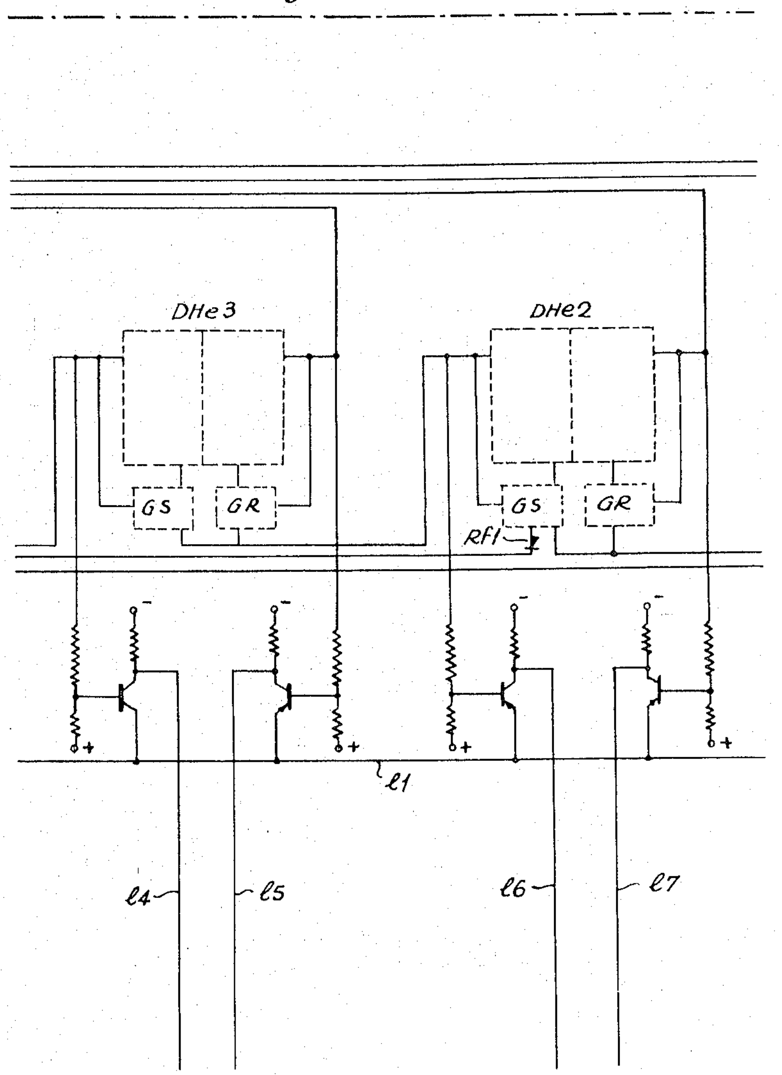
Figure 15A:
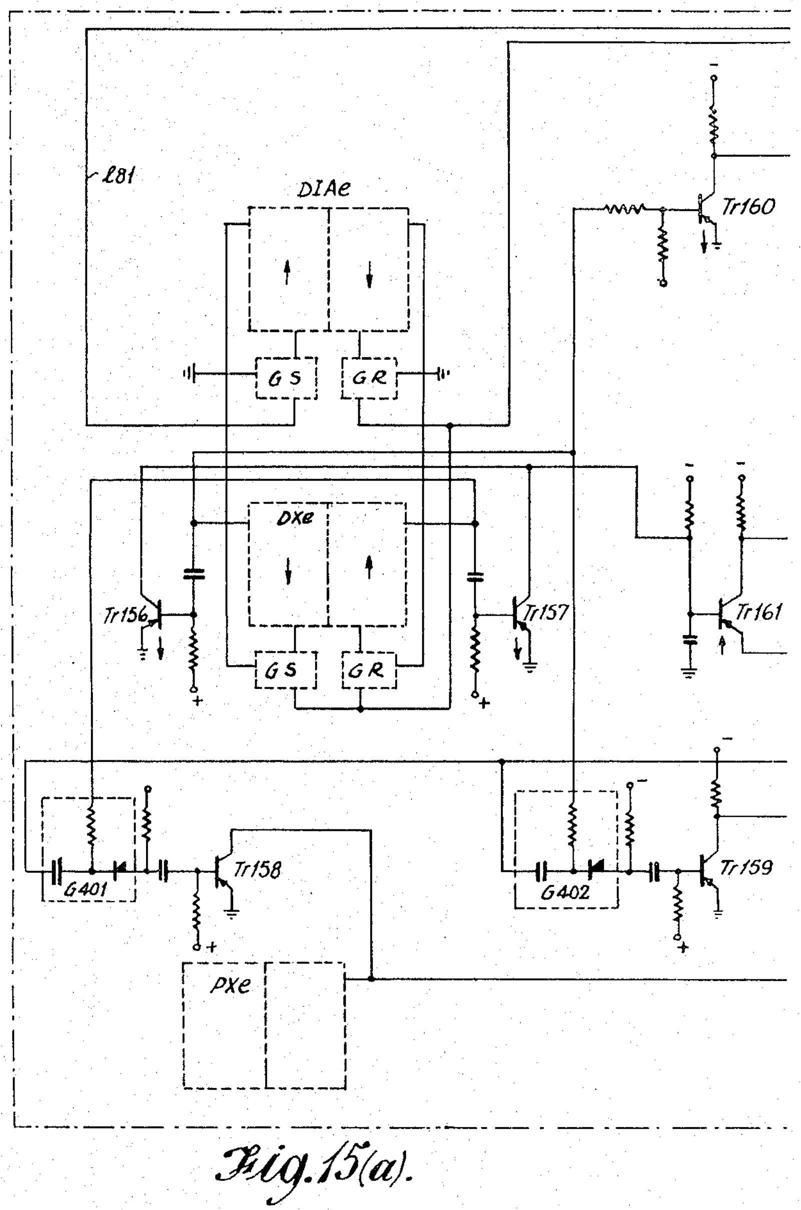
Figure 15B:
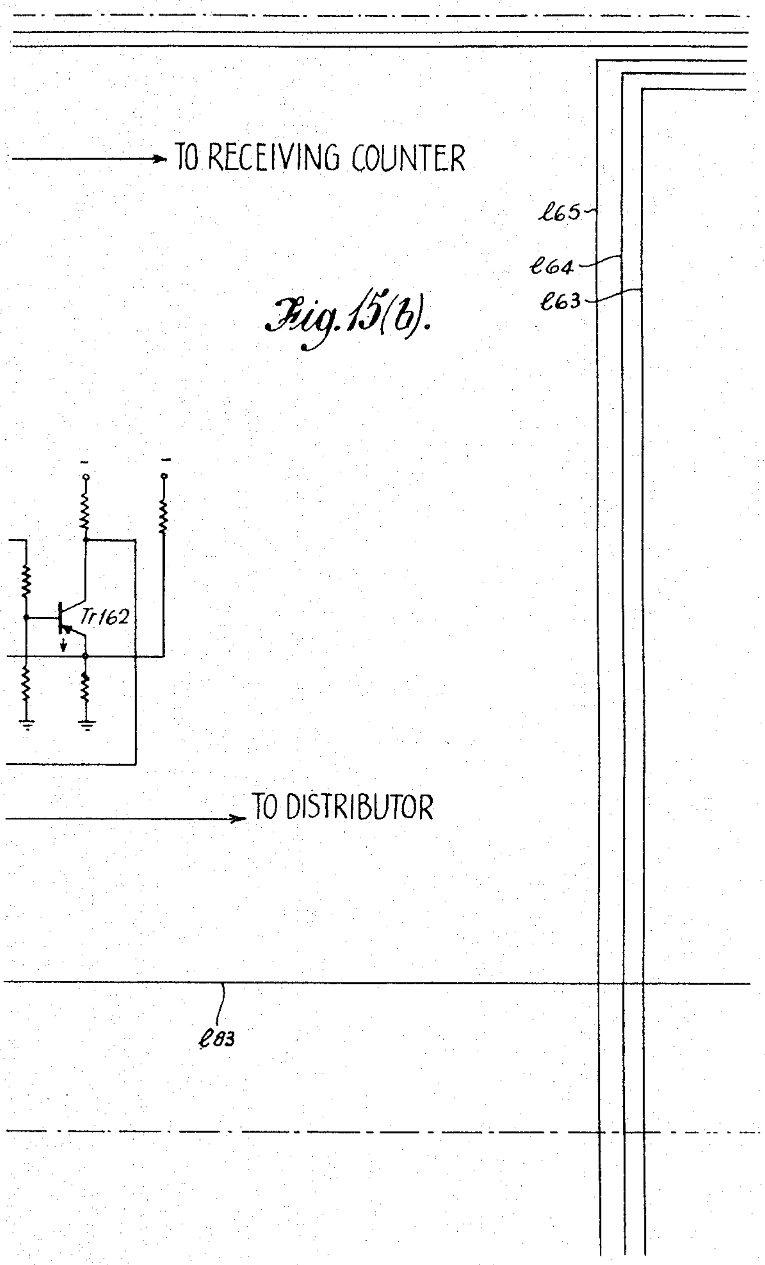

From FIGS. 6, 7 and 9, it will be seen that the collectors of the right-hand transistors of the transistor bistable circuit DU$e$1 and DU$e$2, DH$e$1 to DH$e$4 and DT$e$1 to DT$e$4 are connected, respectively, to the bases of ten transistors T$r$86 to T$r$95 and the collectors of these transistors are connected in common over leads $l$46 to $l$55 to all the registers, such as register REG, later to be described with reference to FIGS. 15 to 17. Consequently, the condition (i.e. re-set or set condition) of the bistable circuits forming the composite counter of the electronic scanner SC will be signified to all the registers by markings on the leads $l$46 to $l$55. More specifically, the one out of ten count positions of the counter formed by bistable circuits DH$e$1 to DH$e$4 will be signified to the registers over leads $l$47 to $l$50, the one out of ten count positions of the counter consisting of bistable circuits DT$e$1 to DT$e$4 will be signified over leads $l$52 to $l$55, while the one out of four count postiions of the binary counter DU$e$1 and DU$e$2 will be identified to the registers by a marking over leads $l$46 and $l$51.

Figure 8A:
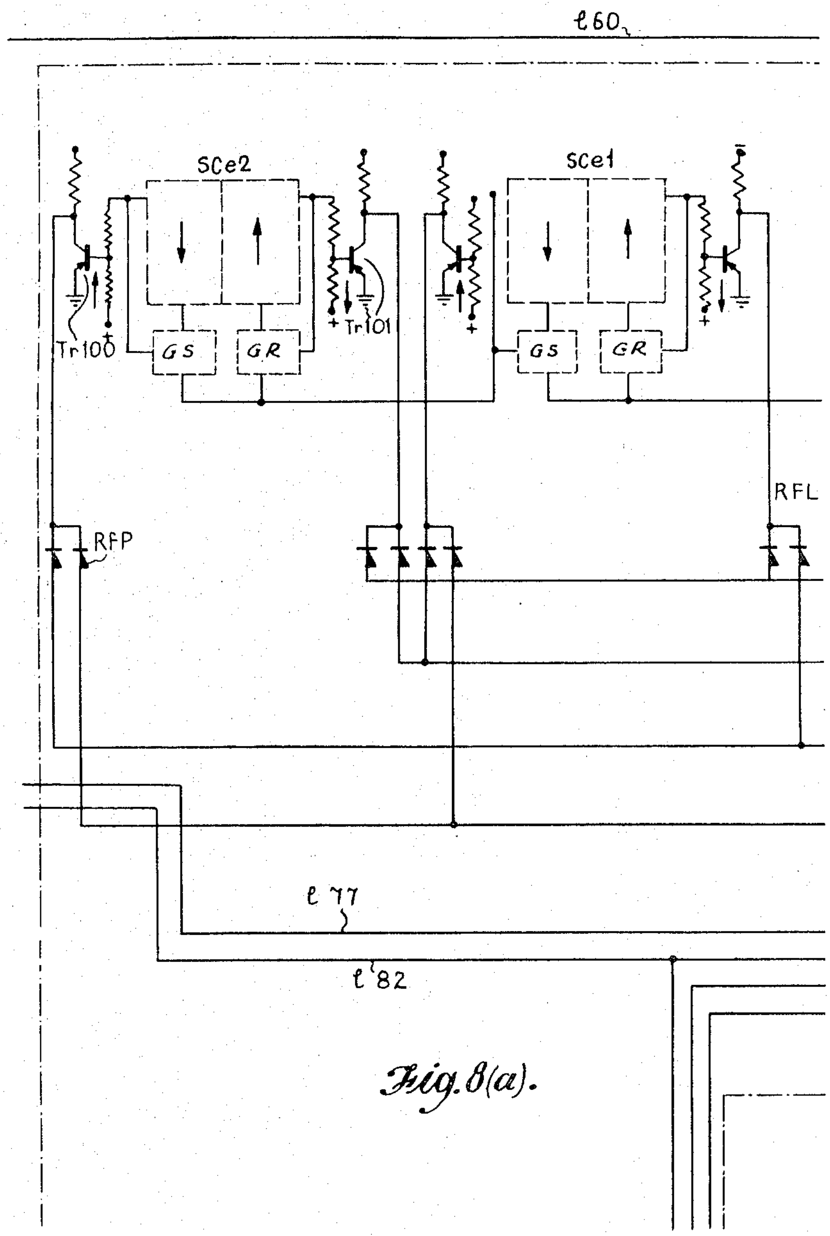
Figure 8B:
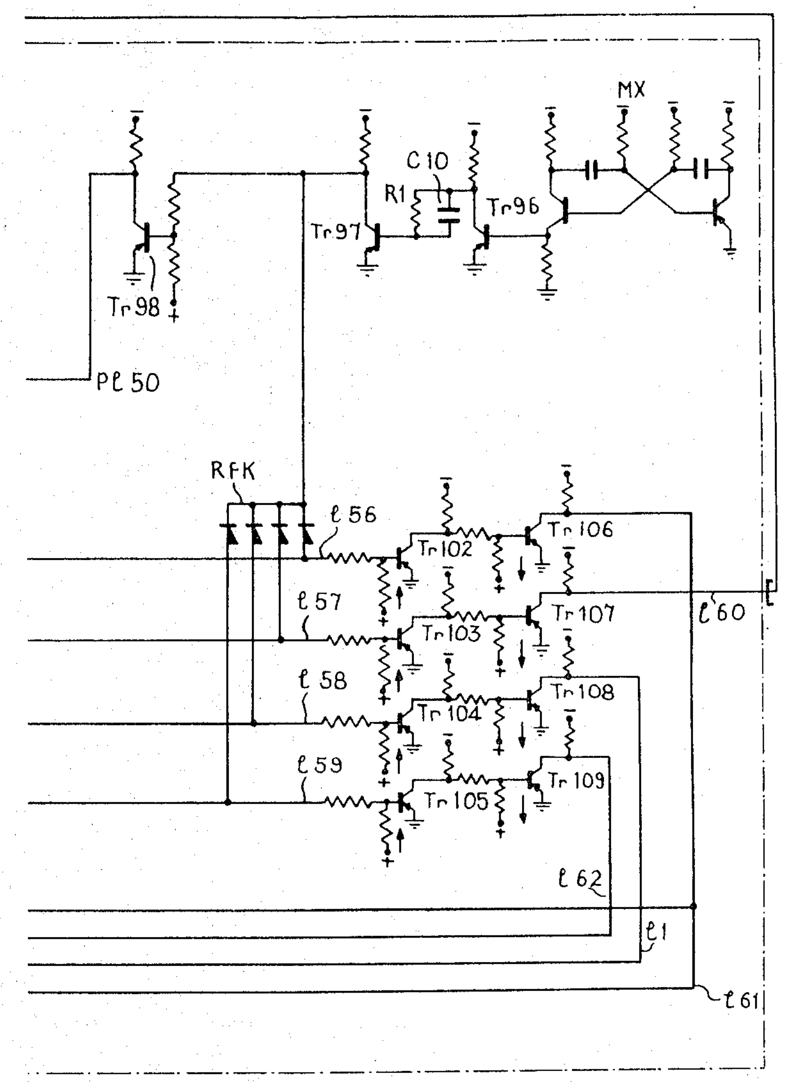

Turning now to the previously mentioned sequence counter of the electronic scanner SC, this counter as can be seen from FIG. 8 comprises a pair of bistable circuits SC$e$1 and SC$e$2 interconnected to provide a cyclic count of four and driven in response to the operation of a free-running transistor multi-vibrator MX which feeds pulses to paraphase transistor stages. The first of these paraphase transistor stages comprises a transistor T$r$96 having it base connected to the emitter of the left-hand transistor of the multi-vibrator MX and having its collector connected to the base of a further transistor T$r$97 of the same stage through a capacitor C10 and a resistor R1 connected in parallel relationship. The collector of the transistor T$r$97 is connected to leads $l$56 to $l$59 via individual rectifiers of a group of rectifiers R$f$K as well as being connected to the base of a transistor T$r$98 constituting the other stage of the paraphase transistor stage and having its collector connected to the commoned pulse inputs of setting and re-setting gates GS and GR associated with the first bistable circuit, namely bistable circuit SC$e$1 of the sequence counter. Each of the bistable circuits SC$e$1 and SC$e$2 has feeder transistors, such as transistors T$r$100 and T$r$101, associated with it, with the bases of these feeder transistors being connected, respectively, to the collectors of the left-hand and right-hand transistors of the associated bistable circuit. The collectors of the feeder transistors are connected, respectively, to various combinations of the leads $l$56 to $l$59 via individual rectifiers of groups of rectifiers, such as rectifier groups R$f$L and R$f$P. The leads $l$56 to $l$59 are connected, respectively, to the bases of normally conducting transistors T$r$102 to T$r$105, the collectors of which are connected, respectively, to the bases of normally nonconducting transistors T$r$106 to T$r$109.

For the purpose of describing the operation of the sequence counter, it may be assumed that at a particular instant in time the left-hand transistor of the free-running multi-vibrator MX is non-conducting. Then the transistor T$r$96 will also be non-conducting since its base in connected to the earth potential applied to the emitter of the left-hand transistor of multi-vibrator MX, but transistor T$r$97 will be conducting as a consequence of the negative potential applied to its base from the collector of transistor T$r$96. Thus earth potential is applied to the base of transistor T$r$98 which is accordingly non-conducting. Negative potential is applied from the collector of transistor T$r$98 to the pulse inputs of gates GS and GR associated with the bistable circuit SC$e$1. When the free-running multi-vibrator MX turns over, namely by its left-hand transistor changing from its non-conducting state to a conducting state, transistor T$r$96 conducts. Transistor T$r$97 is accordingly cut off, whereupon transistor T$r$98 conducts. Transistor T$r$97 applies negative potential from its collector to the rectifiers of the group R$f$K and thus the leads $l$56 to $l$59 to inhibit the gating out of markings applied to the leads $l$56 to $l$59 from the feeder transistors, such as transistors T$r$100 and T$r$101, associated with the bistable circuits SC$e$1 and SC$e$2, by the cutting off of one of the transistors T$r$102 to T$r$105 and the conduction of one of the transistors T$r$106 to T$r$109.

The positive pulse produced at the collector of transistor Tr98 consequent upon the latter becoming conductor is fed over a pulse lead pl50 to the pulse inputs of the pulse-plus-bias setting and re-setting gates GS and GR associated with the bistable circuit SCe1. Assuming that the right-hand transistor of the bistable circuit SCe1 is conducting (this being indicated by the upward pointing arrow) and the left-hand transistor of the circuit SCe1 is cut off (this being indicated by the downward pointing arrow) then the re-setting gate GR will be opened by the positive potential applied to its bias input from the collector of the right-hand transistor of the circuit SCe1 while the setting gate GS will be closed. Consequently, the positive pulse that is applied to the pulse input of these gates GS and GR over pulse lead pl50 will only pass through the gate GR to cause the right-hand transistor of the bistable circuit SCe1 to be cut off and the left-hand transistor to conduct. Thus, the conditions of the feeder transistors, such as transistors Tr100 and Tr101, will be reversed so that negative potential will now be applied through rectifiers to the leads l57 and l59 from the collector of left-hand feeder transistor associated with the circuit SCe1. The condition of the bistable circuit SCe2 will also be changed by the positive pulse fed to its opened re-setting gate GR so that negative potential is applied via rectifiers to the leads l58 and l59 from the collector of the left-hand feeder transistor Tr100 associated with the bistable circuit SCe2. When the multivibrator MX again turns over, the transistor Tr96 is cut off due to the cutting off of the left-hand transistor of the multi-vibrator, whereupon transistor Tr97 conducts and thereby removes the negative inhibiting potential applied to all the leads l56 to l59 via the rectifiers of the rectifier group RfK as a consequence of which the transistor Tr102 only is cut off since the lead l56 connected to the base of this transistor does not have negative potential applied to it.

The transistor Tr102 when it is cut off causes transistor Tr106 to conduct and thereby apply an earth pulse to lead l61 connected to the commoned setting and re-setting gates of the bistable circuit DUe1 (FIG. 9) to cause the composite counter of the electronic scanner constituted by the ten bistable circuits DUe1, DUe2, DHe1 to DHe4 and DTe1 to DTe4 to step to its its next count position. This earth pulse is also applied to the re-setting gate of bistable circuits in the registers, such as register REG, to be described later. It will be recalled that as the free-running transistor multi-vibrator MX turned over for the second time, transistor Tr97 was caused to conduct, thereby removing the inhibiting negative potential applied to the leads l56 to l59 via rectifiers RfK. When the multi-vibrator MX turns over for the third time, the inhibiting negative potential is re-applied to the leads l56 to l59 via rectifiers RfK and causes the earth potential to be removed from the lead l61 as a consequence of the conduction of transistor Tr102 and the cutting off of transistor Tr106, while the conduction of transistor Tr98 causes an earth pulse to be applied to the commoned setting and re-setting gates of the bistable circuit SCe1 to step the sequence counter. The bistable circuit SCe1 is in the re-set state, as a consequence of which the setting gate GS only will be opened due to the positive potential applied to the bias input of this gate GS from the collector of the left-hand transistor. The positive pulse received at the pulse inputs of the gates GS and GR will thus cause the bistable circuit SCe1 to be changed from its re-set state to its set state, in which the left-hand transistor of the circuit is cut off while the right-hand transistor is rendered conducting. The conditions of the two feeder transistors, such as transistors Tr100 and Tr101, are thus reversed. The state of the other bistable circuit SCe2 and the conditions of its associated feeder transistors remain unchanged. Thus negative potential will be applied to the leads l56 and l58 from the collector of the right-hand feeder transistor associated with the bistable circuit SCe1 and negative potential will be applied to the leads l58 and l59 from the left-hand feeder transistor Tr100 associated with the bistable circuit SCe2. As the transistor multi-vibrator MX turns over for the fourth time, the transistor Tr96 is rendered non-conducting thus causing transistor Tr97 to conduct so as to remove the negative inhibiting signal applied to all the leads l56 to l59 through the rectifiers of the rectifier group RfK. The absence of a negative potential on the lead l57 causes transistor Tr103 to be cut off and by so doing transistor Tr107 is caused to conduct thereby applying an earth pulse on the lead l60 extending into the register REG. The collector of transistor Tr107 is not connected to the composite counter: this is to allow the composite counter of the electronic scanner SC, which was stepped to the next count position by the pulse on lead l61 when transistor Tr106 was rendered conducting, time to settle down before markings signifying its count position are gated out. In response to subsequent turning over of the free-running transistor multi-vibrator MX, the sequence counter bistable circuits SCe1 and SCe2 are set and/or re-set, as the case may be, so that earth pulses are delivered in turn to leads l1 and l62 as a consequence of the conduction of transistors Tr108 and Tr109, and thereafter, a further counting cycle is commenced by the sequence counter so that pulses are again applied in succession to the three leads l61, l1 and l62. The earth pulse which is applied to the lead l1 serves to prime the gating transistors, such as gating transistors Tr20 and Tr21, associated with the bistable circuit DUe1 so that these transistors can gate out markings on to the leads l2 to l9, l20 to l27 and l38 to l41 signifying the condition of the various bistable circuits DHe1 to DHe4, DTe1 to DTe4 and DUe1 to DUe2. The marking gated on to leads l2 to l9 by the gating transistors associated with the bistable circuits DHe1 to DHe4 is applied through rectifiers to leads l10 to l19. As previously mentioned, these leads l10 to l19 are connected, respectively, to the bases of normally conducting transistors Tr22 to Tr31 and the marking applied to the leads l10 to l19 in the form of negative potential on nine of the ten leads l10 to l19 will cause one of the transistors Tr22 to Tr31 to be cut off. The marking gated on to the leads l38 to l41 via the gating transistors associated with the bistable circuits DUe1 and DUe2 is applied to leads l42 to l45 (FIG. 10) via the rectifiers of rectifier groups, such as rectifier groups RfB and RfC. The leads l42 to l45 are connected to the bases of normally conducting transistors Tr32 to Tr35 and the markings applied to these leads will cause one of the transistors Tr32 to Tr35 to be rendered non-conducting. Thus, it will be appreciated that negative potential will be applied to two of the group of terminals t1 according to the count position of the composite counter and since these two terminals are connected by strappings to the base of one of the transistors Tr36 to Tr75, the relevant transistor will be caused to conduct and so apply an earth pulse to one of the pulse leads pl0 to pl39 (FIG. 3). The gating transistors associated with the bistable circuits DTe1 to DTe4 gate a marking on to the leads l20 to l27 and a marking is extended over rectifiers of rectifier groups, such as rectifier groups RfQ and RfU, to leads l28 to l37 which are connected, respectively, to the bases of normally conducting transistors Tr76 to Tr85. This marking causes one of the transistors Tr76 to Tr85 to be cut off and this transistor in cutting off causes one of the gating transistors Tr110 to Tr119 to conduct and thereby extending earth to the emitter of one of the transistors Tr10 to Tr19 (FIG. 3) to prime this transistor. Thus, it will be seen that a pulse is applied to one of the leads pl0 to pl39 and thus the commoned pulse inputs of one group of ten gates, such as the gates G390 to G399 associated with the lead pl39, by the conduction of one of the transistors Tr36 to Tr75, while a gating transistor associated with the pulse outputs of one group of forty gates, such as gates G000, G010 . . . G390, is primed by the conduction of one of the transistors Tr110 to Tr119.

Figure 4A:
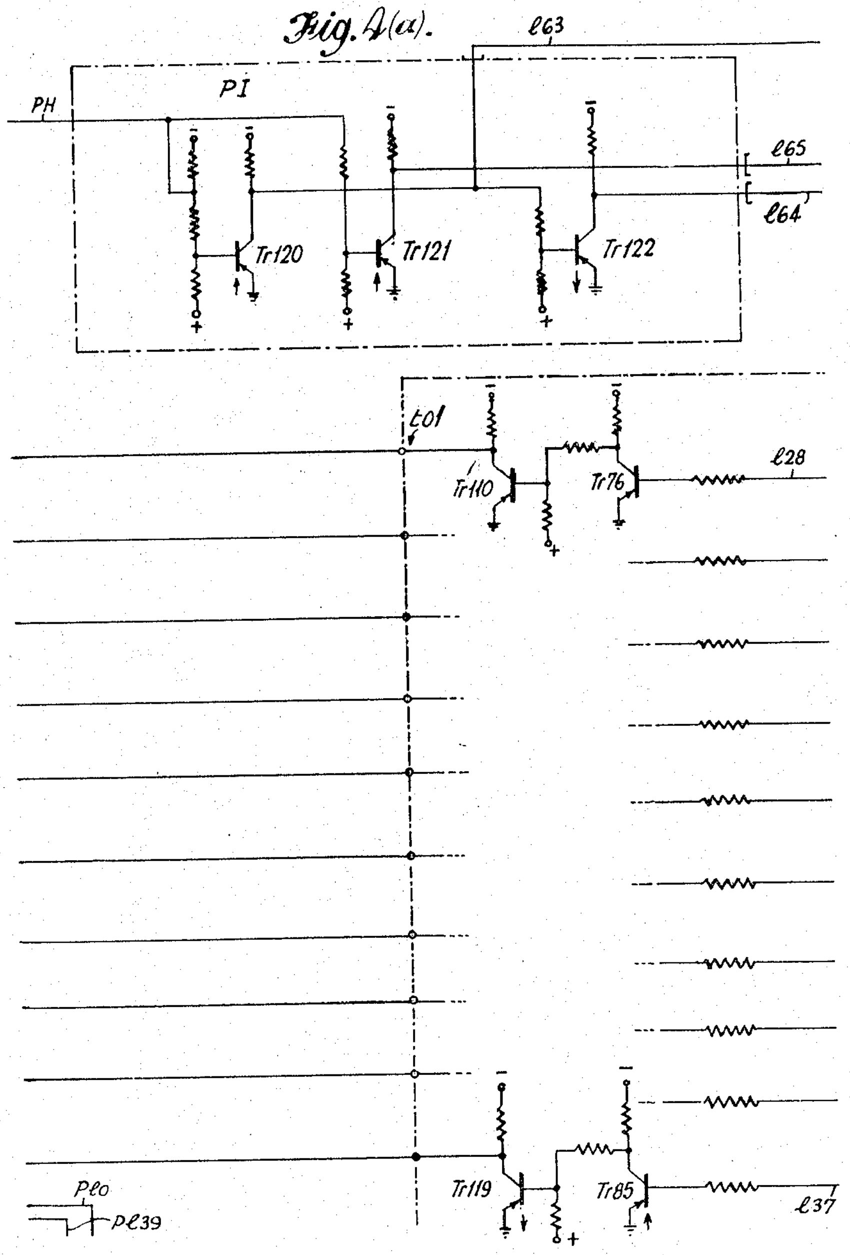

Before considering the effect of the pulse applied from the sequence counter to the lead l62 in response to the conduction of transistor Tr109 (FIG. 8), it is considered convenient at this juncture to refer to the pulse inhibit circuit PI shown in FIG. 4 of the drawings. It will be recalled that the collectors of the gating transistors Tr10 to Tr19 (FIG. 3) are connected in common to the pulse path PH. This pulse highway PH is connected in the pulse inhibit circuit PI to the base of a normally conducting transistor Tr120 as well as to the base of a further normally conducting transistor Tr121. The collector of the transistor Tr120 is connected to the base of a normally non-conducting transistor Tr122 and to all of the registers, such as the register REG, in common over a lead l63. The collector of the transistor Tr122 is connected in common to all the registers over a lead l64 and a further lead l65 is connected to all of the registers in common from the collector of the normally conducting transistor Tr121. It may here be explained that a positive pulse applied to the pulse path PH via one of the gating transistors Tr10 to Tr19 as will hereinafter be described will cause the transistors Tr120 and Tr121 in the pulse inhibit circuit to be cut off. Assuming that none of the registers, such as the register REG, has been taken into use in respect of the incoming junction having associated with it the gating circuit (i.e. one of the gating circuits G000 to G399) through which the pulse appearing on the pulse path PH was obtained then the transistor Tr122 will be caused to conduct, thereby applying an earth pulse to the lead l64 for the seizure of one of the registers, such as register REG, selected for dealing with the next incoming junction call. If, however, a register had already been taken into use in respect of the junction concerned then earth potential applied to the lead l63 from the register taken into use in respect of that junction would prevent conduction of the transistor Tr122 and thus inhibit this transistor from applying an earth pulse to the lead l64 for the seizure of the next allocated free register. However, the transistor Tr121 will be cut off and earth potential normally extended to the registers over lead l65 will be replaced by negative potential. Pulses fed over this lead l65 to a register that has been taken into use are utilised for the supervision of dialling on calling incoming junctions as will be described later.

Reverting at this juncture to the sequence counter (FIG. 8) to consider the effect of the last earth pulse of the count cycle applied to the lead l62, this pulse is applied to the commoned emitters of ten pairs of gating transistors, such as the pair of transistors Tr123 and Tr124, corresponding to the pairs of gating transistors associated with the ten bistable circuits, DHe1 to DHe4, DTe1 to DTe4 and DUe1 and DUe2 constituting the composite counter of the electronic scanner SC. These gating transistors, such as transistors Tr123 and Tr124 have their collectors connected, respectively, to the leads l2 to l9, l20 to l27 and l38 to l41. Thus in the last count position of the count cycle of the sequence counter, these gating transistors are primed for gating out on to the leads just above referred to any markings received from one of the registers over the leads l66 to l75, and representing the identity of a calling incoming junction for which the register has been taken into use, when that register is scanned as will be described later. These marking leads l66 to l75 are connected, respectively, to the bases of the left-hand transistors, such as transistor Tr124, of the pairs of gating transistors as well as to the bases of inverting transistors, such as transistor Tr125, having their collectors connected to the bases of the right-hand transistors, such as transistor Tr123, of the pairs of gating transistors. It is now considered convenient to describe the register REG (FIGS. 15, 16 and 17) initially in connection with the markings received from a register by the electronic scanner SC over the leads l66 to l75. The markings referred to will be gated on to the leads l66 to l75 via ten gating transistors, such as transistor Tr126 (FIG. 16) of the register REG. These gating transistors, such as transistor Tr126, are arranged to be primed in response to the conduction of a normally non-conducting transistor Tr127 in response to a negative signal applied over a lead l76 connected to the commoned collectors of transistors Tr128 and Tr129 (FIG. 17). The base of the transistor Tr129 is connected to the collector of the left-hand transistor of a register scan bistable circuit Re having setting and re-setting gates GS and GR associated with it. The pulse input of the re-setting gate of the register scan bistable circuit Re is connected in common with the pulse inputs of the re-setting gates of corresponding register scan bistable circuits in the other registers over lead l77 to the lead l61 connected to the collector of the output transistor Tr106 of the sequence counter (FIG. 8) so that the register scan bistable circuits may be re-set when the composite counter of the electronic scanner SC is stepped, while the pulse input of the setting gate GS of the register scan bistable circuit Re is connected by lead l78 to one of the pulse leads pl0 to pl39 (FIG. 3).

The register REG comprises a first decade store STT comprising four bistable transistor circuits STe1 to STe4 each having a gating transistor associated with it, the collector of which is connected to the collector of the normally non-conducting left-hand transistor of its associated storage bistable circuit with the base of the gating transistor being connected to one of the leads l52 to l55 which as previously mentioned are extended to all the registers, such as register REG, in common from the electronic scanner SC. The register REG also comprises a second decade store STH similar to store STT and comprising four bistable circuits SHe1 to SHe4 having respective gating transistors associated therewith. The bases of these gating transistors are connected to the leads l47 to l50 extended from the electronic scanner SC. A further pair of transistor bistable circuits SUe1 and SUe2 (FIG. 17) constituting a binary store STU are provided and these bistable circuits similarly have gating transistors associated therewith which have their bases taken to the leads l46 and l51 extending from the electronic scanner SC to the register REG. The emitters of the gating transistors associated with the bistable circuits of the decade stores STT and STH and the binary store STU are connected in common to a lead l79 to which an earth pulse can be applied in the manner later to be described for the purpose of priming the gating transistors.

Figure 12A:
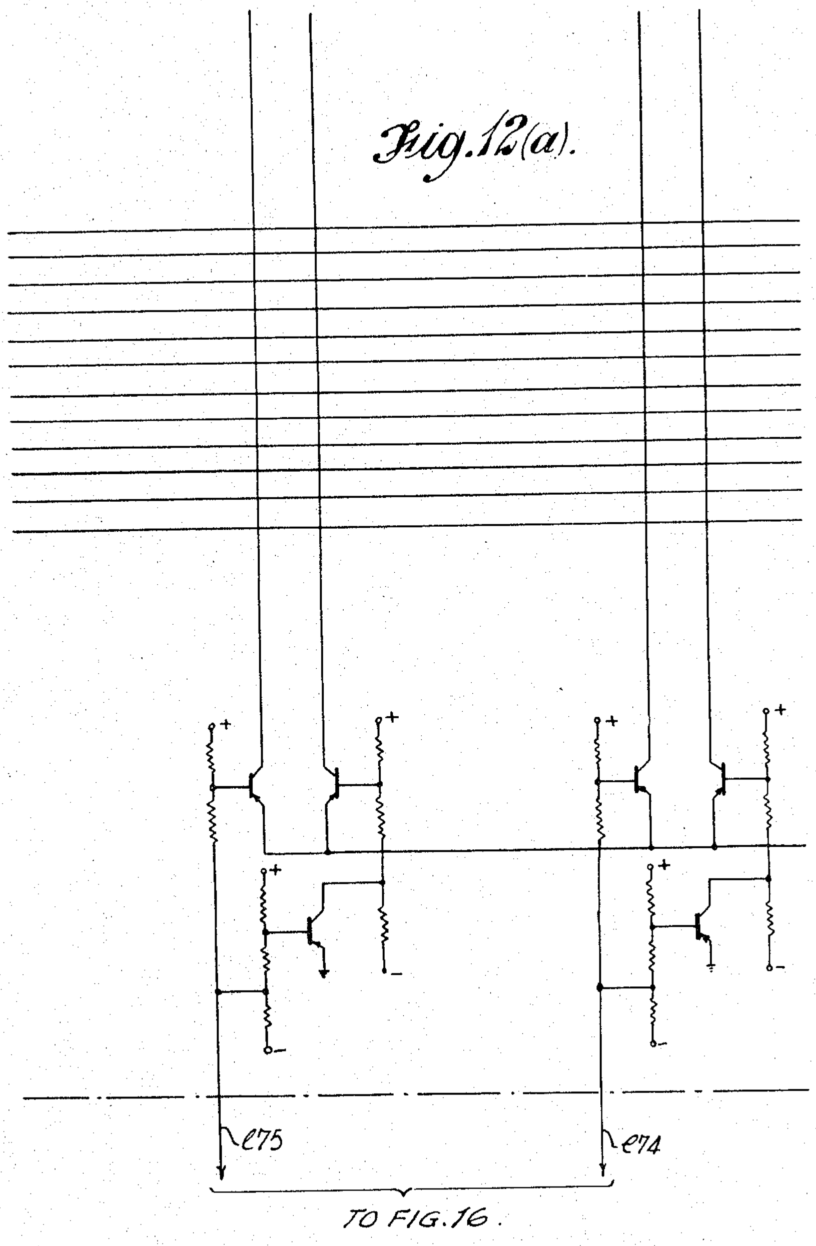
Figure 12B:
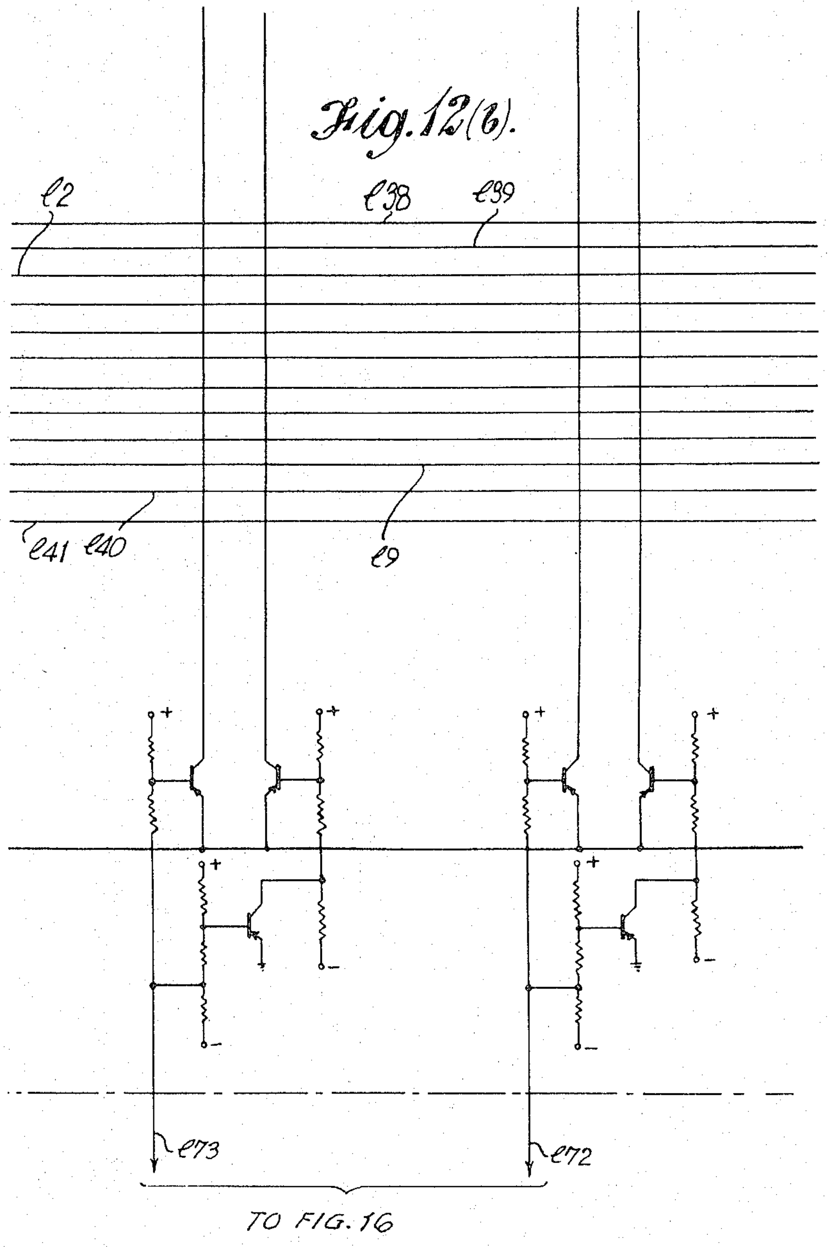

The collectors of the normally conducting right-hand transistors of the storage bistable circuits STe1 to STe4 are connected, respectively, to comparator elements COM1 to COM4 as well as to the bases for four gating transistors, such as transistor Tr126, for gating out markings to the electronic scanner SC on leads l72 to l75 (FIG. 12). The collectors of the normally conducting right-hand transistors of the storage bistable circuits SHe1 to SHe4 are connected, respectively, to associated comparator elements COM11 to COM14 and the bases of gating transistors connected to leads l67 to l70 (FIGS. 13 and 14), while the collectors of the right-hand transistors of the two storage bistable circuits SUe1 and SUe2 of the store STU (FIG. 17) are connected to associated comparator elements COM111 and COM112 and in addition to the bases of the two gating transistors, such as transistor Tr126, having their collectors connected to leads l66 and l71.

Figure 16A:
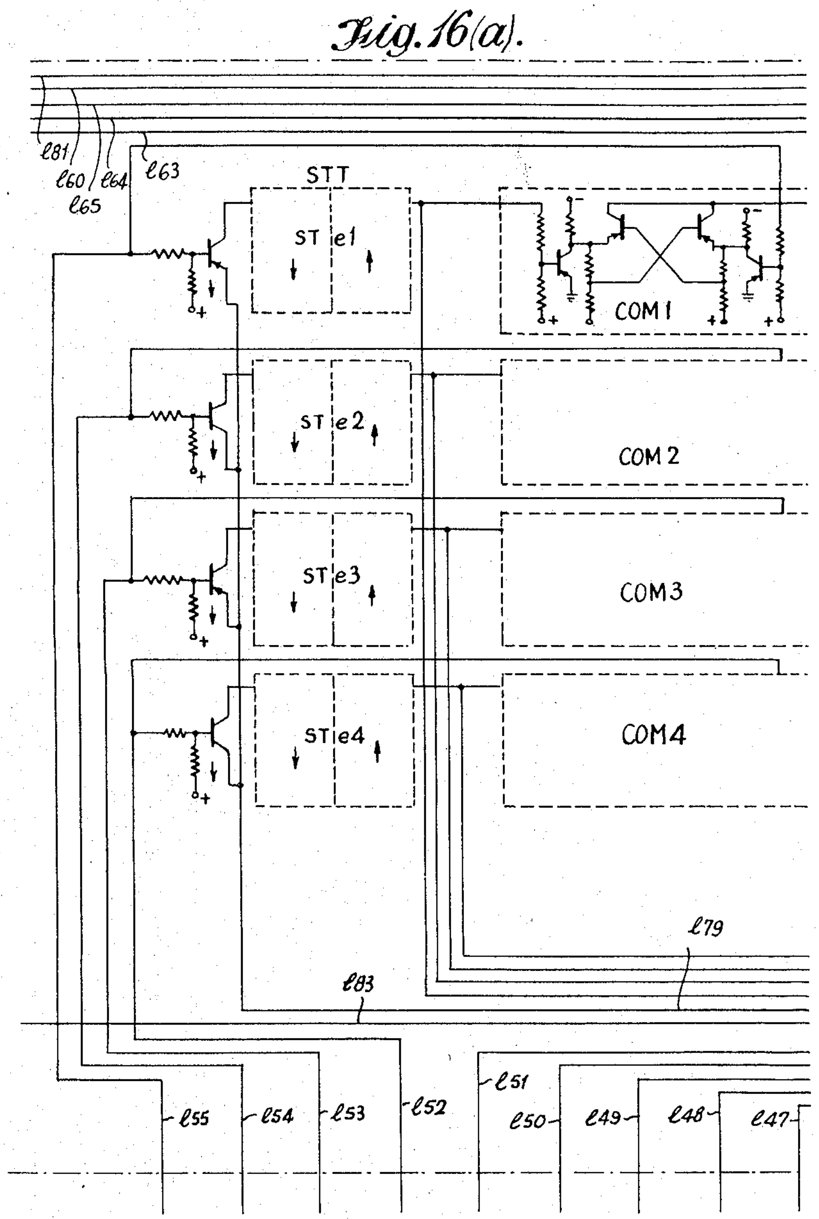
Figure 16B:
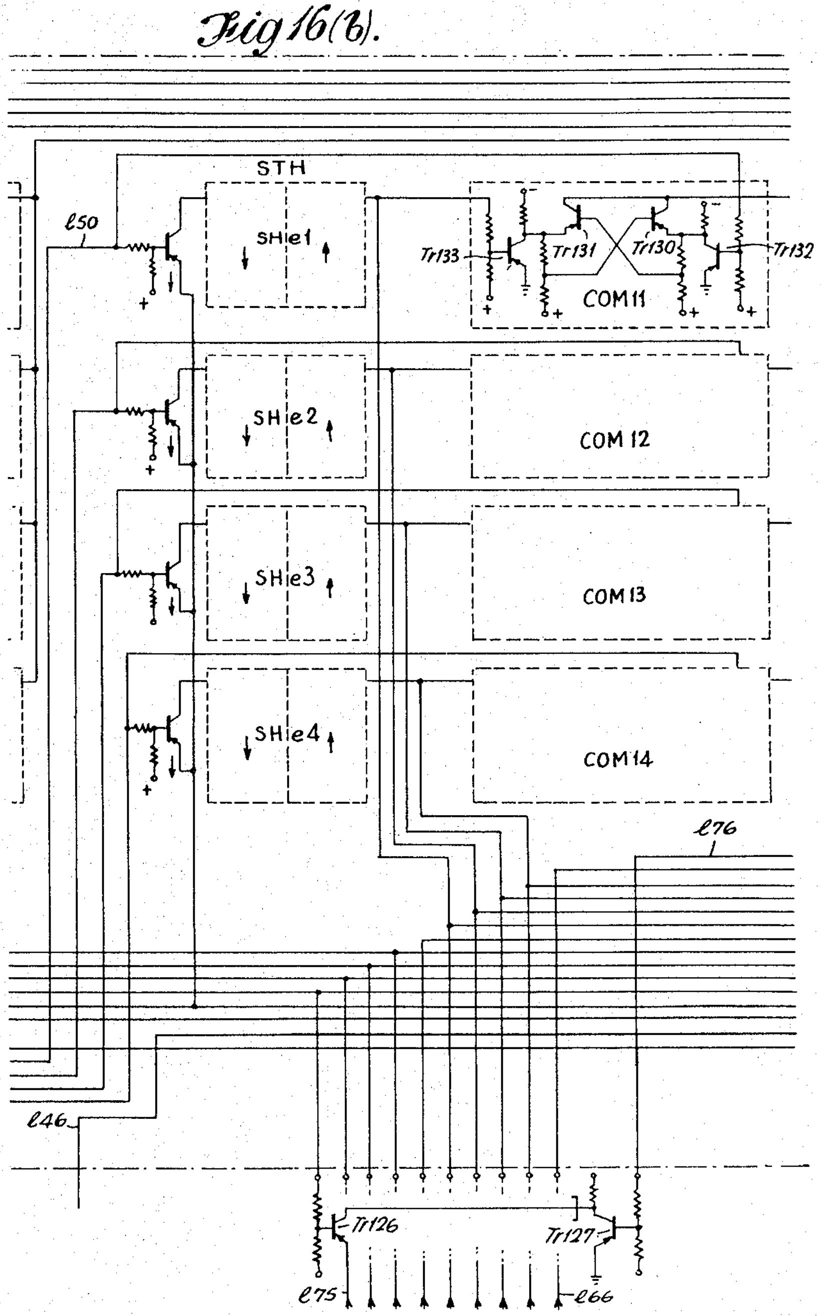

As can be seen from FIG. 16, each of these comparator element comprises a pair of transistors, such as transistors Tr130 and Tr131 having commoned collectors and having their bases cross-connected to the respective emitters, these emitters being connected, respectively, to the collectors of two normally non-conducting feeder transistors Tr132 and Tr133. The base of the transistor Tr133 is connected to the collector of the normally conducting right-hand transistor of the associated bistable circuit, such as bistable circuit SHe1, while the base of the corresponding transistor Tr132 is connected to the base of the gating transistor on the left of the bistable circuit SHe1 and thus it is also connected to one of the leads l46 to l55 (FIG. 6) extended to the register REG from the electronic scanner SC. Each of these comparator elements, such as the comparator element COM11, associated with the storage bistable circuit SHe1 of the decade store STH, serves for comparing the polarity of the potential on one of the leads, such as the lead l50, with that of the collector of the right-hand transistor of one of the storage bistable circuits, such as the storage bistable circuit SHe1. If the polarity of the potentials is the same then the condition of the feeder transistors of the comparator element, such as the transistors Tr132 and Tr133, will also be the same and both of the other transistors of the same comparator element, such as the transistors Tr130 and Tr131, will be non-conducting. However, if the polarity of potentials is different then the condition of the feeder transistors, such as the transistors Tr132 and Tr133, will be different and one or other of the transistors Tr130 and Tr131 will conduct as a consequence of which positive potential will be applied to the commoned collectors of the transistors Tr130 and Tr131. The commoned collectors of the transistors, such as the transistors Tr130 and Tr131, of the respective comparator elements COM1 to COM4, COM11 to COM14, COM111 and COM112 are connected in common to the base of a normally conducting transistor Tr134 (FIG. 7). Consequently, this transistor Tr134 which due to its conduction normally applies earth potential over lead l63 to the interconnected collector of transistor Tr120 and the base of transistor Tr122 of the pulse inhibit circuit PI (FIG. 4) would be cut off, thereby removing the positive potential from the lead l63 if any of the transistors, such as the transistors Tr130 and Tr131, in the comparator elements of the register conducts.

As has been mentioned previously, a free register, such as the register REG, will be selected (for dealing with the next call on an incoming junction) by a one-only selector circuit (not shown). For the selection of this free register, such as the register REG, a negative potential is applied to the base of a normally non-conducting transistor Tr135 (FIG. 17) over a lead l80. This negative potential serves to render the normally non-conducting transistor Tr135 conducting and the consequent earth potential at the collector of this transistor serves to bias open a pulse-plus-bias gate G400, the pulse input of which is connected over lead l64 to the collector of normally non-conducting transistor Tr122 in the pulse inhibit circuit PI (FIG. 4). The pulse output from the pulse-plus-bias gate G400 is connected to the base of a normally conducting transistor Tr136 which has its collector connected to the base of a normally non-conducting transistor Tr137. The collector of this transistor Tr137 is connected to the lead l79 which is connected in common to the emitter of the gating transistors associated with the bistable circuits constituting the two decade stores STT and STH and the binary store STU. The collector of the transistor Tr137 is also connected to the pulse input of a permanently open setting gate GS associated with a busy/free bistable circuit BFe which also has associated with it a re-setting gate having its bias input connected to the collector of the right-hand transistor of a bistable circuit PXe (FIG. 15). The transistor Tr121 in the pulse inhibit circuit PI (FIG. 4) has its collector connected over the lead l65 to the base of a normally non-conducting transistor Tr138 (FIG. 17) which has its emitter connected to the collector of a normally non-conducting transistor Tr139, the base of which is connected to the commoned collectors of the normally conducting transistors Tr128 and Tr129, the latter transistor Tr129 having its base connected as aforesaid to the collector of the left-hand transistor of the register scan bistable circuit Re.

Having now described sufficient of the register REG to enable the scanning of the gating circuits G000 to G399, associated respectively with the incoming junctions, by the electronic scanner SC to be understood, this scanning operation for the detection of calls initiated on incoming junctions associated with these gating circuits will now be described. As has been mentioned, the composite counter of the electronic scanner SC comprising the bistable circuits DHe1 to DHe4, DTe1 to DTe4 and DUe1 and DUe2 is stepped to its next count position in response to an earth pulse applied to the lead l61 from the sequence counter comprising the bistable circuits SCe1 and SCe2. This earth pulse is simultaneously applied to the lead l77 for re-setting the register scan bistable circuits, such as the bistable circuit Re in the register REG. Thus the left-hand transistor of the register scan bistable circuits, such as the bistable circuit Re, will be non-conducting as indicated by the downward pointing arrow, and thus the transistor Tr129 will be conducting. The transistor Tr139 and the transistor Tr127 (FIG. 16) will both be cut off at this stage due to the conduction of both of the transistors Tr128 and Tr129. The next effective pulse output from the sequence counter is applied to the lead l1 (FIG. 9) which serves to prime the pairs of gating transistors, such as the pair of transistors Tr20 and Tr21, associated with the respective bistable circuits of the composite counter so that these gating transistors can gate markings corresponding to the count position of the composite counter on to the leads l2 to l9, l20 to l27 and l38 to l41. As a consequence one of the transistors Tr36 to Tr75 (FIG. 10) according to the count position of the counters constituted by the bistable circuits DHe1 to DHe4 and DUe1 and DUe2 will be rendered conducting, thereby applying an earth pulse to one of the pulse leads pl0 to pl39, each of which is common to the pulse inputs of a group of ten gating circuits, such as the gating circuits G390 to G399, having their pulse inputs connected to the pulse lead pl39. At the same time, one of the transistors Tr110 to Tr119 (FIG. 4) is rendered conducting according to the count position of the counter comprising the bistable circuits DTe1 to DTe4 and, in conducting, this transistor primes one of the gating transistors Tr10 to Tr19. For the purpose of description, let it be assumed that a call is initiated on the particular incoming junction I/CJ390 shown in FIG. 3. The line wires w1 and w2 of this incoming junction will be looped thus producing operation of the impulsing relay A in the incoming junction relay set RS390. When the impulsing relay A operates, make contact a1 of this relay applies earth potential to the bias input of the gating circuit G390 associated with the incoming junction I/CJ390. Thus, the gating circuit G390 will be opened and if it is assumed that an earth scanning pulse is applied by the electronic scanner to the pulse lead pl39 in response to the operation of transistor Tr75 (FIG. 10) then this pulse will be applied to the pulse input of the opened gating circuit G390. If it is also assumed that the transistor Tr10 (FIG. 3) is primed by the application of earth potential to its emitter from the collector of transistor Tr110 which is caused to conduct by the marking on leads l28 to l37, the earth pulse applied to the pulse input of the open gate G390 after passing through this gate on to the pulse lead pl40 causes amplifier transistor Tr0 to be cut off and by so doing transistor Tr0 applies negative potential to the base of the primed transistor Tr10 which will accordingly conduct and supply an earth pulse to the pulse path PH. The earth pulse applied to the pulse path PH will cause the normally conducting transistor Tr120 to be cut off so that negative potential is applied to the base of the transistor Tr122 to render this latter transistor conducting, an inhibiting potential having been removed from the lead l63 as will be described later. In conducting, the transistor $Tr122$ applies an earth pulse to the lead $l64$ which, as has previously been mentioned, is connected to the pulse inputs of gates, such as gate G400 (FIG. 17), of all the registers including the register REG which it has been assumed has been selected to deal with the next incoming junction call by the one-only selector circuit. The gate G400 will thus be open due to the positive potential applied to its bias input in response to the conduction of transistor $Tr135$ to negative potential applied to its base from the one-only selector circuit over the lead $l80$. Reverting to the pulse inhibit circuit PI (FIG. 4) the earth pulse applied to the pulse path PH will also cut off normally conducting transistor $Tr121$ and in so doing negative potential will be applied to the lead $l65$ to the base of transistor $Tr138$ (FIG. 17). This negative potential applied to the base of transistor $Tr138$ will be ineffective to render this transistor conducting due to the non-conduction of the transistor $Tr139$ having its base connected to the commoned collectors of the conducting transistors $Tr128$ and $Tr129$. The transistor $Tr128$ conducts as a result of the negative potential applied to its base from the collector of the transistor $Tr109$ (FIG.8). The earth pulse applied in common to the pulse inputs of the seize gates of all the registers including register REG passes only through the open register seize gate G400 of the register REG and causes transistor $Tr136$ to be cut off. Transistor $Tr137$ accordingly conducts and applies an earth pulse to the pulse input of the setting gate GS of the register busy/free bistable circuit $BFe$. This register busy/free bistable circuit $BFe$ in setting causes a pulse to be applied from the collector of its right-hand transistor to the one-only register selector circuit (not shown) to indicate to the selector circuit that the register REG has been taken into use for dealing with an incoming junction call. The one-only selector then applies earth potential over lead $l80$ to effect closure of the gating circuit G400 by the application of negative potential to its bias input. Transistor $Tr137$ in conducting also applies earth potential to the lead $l79$ which is connected in common to the emitters of the gating transistors associated, respectively, with the storage bistable circuits of the decade stores STT and STH and the binary store STU in order to prime these gating transistors. Reverting to the time when the sequence counter applied an earth pulse to the lead $l61$ by the conduction of the transistor $Tr106$ in the first count position of the sequence counter, it will be recalled that the composite counter of the electronic scanner SC was stepped to its next count position. Markings corresponding to the set/re-set patterns of the bistable circuits of the counters constituting the composite counter were thus applied to the leads $l46$ to $l55$ (FIG. 6) as a consequence of the operation of one or more of the transistors $Tr86$ to $Tr95$ having their collectors connected, respectively, to the leads $l46$ to $l55$ which extend in common to all of the registers, including the register REG. Each of the registers, such as register REG, upon receiving these markings from the electronic scanner SC over the leads $l46$ to $l55$ would have made a comparison by means of its comparator elements, such as comparator elements COM1 to COM4, COM11 to COM14 and COM 111 and COM 112, between the marking potentials applied to the leads $l52$ to $l55$, $l47$ to $l50$ and $l46$ and $l51$ to compare these markings with the potentials at the collectors of the right-hand transistors of the storage bistable circuits associated with the elements. The register REG being free, the marking potentials on the leads connected to the bases of the gating transistors associated with the storage bistable circuits would not correspond to the potentials at the collectors of the right-hand transistors of these bistable storage circuits and consequently one or more of the comparator elements would respond so that one or other of the two transistors, such as transistors $Tr130$ and $Tr131$, would conduct so as to apply earth potential to the base of the normally conducting transistor $Tr134$ to cut off this transistor and thereby remove inhibiting earth potential from the lead $l63$ which extends to the junction between the collector of the transistor $Tr120$ and the base of the transistor $Tr122$ in the pulse inhibit circuit PI. This removal of the inhibiting earth potential enabled the transistor $Tr122$ to conduct when the earth pulse was applied to the pulse path PH through the gate G390. It will be remembered that the earth pulse that was applied to the pulse input of the gate G400 (FIG. 17) caused the transistor $Tr137$ to conduct and so open the gating transistors associated with the respective storage bistable circuits of the stores STT, STH and STU. These gating transistors thus operate according to a pattern determined by the set/re-set states of the bistable circuits forming the composite counter of the electronic scanner SC and thereby cause storage bistable circuits of the stores STT, STH and STU to be set in accordance with the operating pattern of the gating transistors. Thus, it will be appreciated that the store STT stores the identity of the count position of the decade counter comprising the bistable circuits $DTe1$ to $DTe4$. Store STH stores the identity of the count position of the decade counter comprising the bistable circuits $DHe1$ to $DHe4$, while the store STU stores the identity of the count position of the binary counter comprising the bistable circuits $DUe1$ to $DUe2$. The stored identities of the count positions of the three counters of the composite counter together serve for identifying the one out of four hundred gating circuits (i.e. gating circuit G390) and thus the calling incoming junction (i.e. I/CJ390) with which the identified gating circuit is associated. It can readily be arranged that the identity stored in the register decade store STT represents the thousands digit value of the calling incoming junction's number, the identity stored in the register decade store STH, the hundreds digit value of the calling junction's number, while the identity stored in the binary store STU of the register REG serves for representing which of the four outlets of the line connector L/C (FIG. 3) allocated to incoming junctions has the calling incoming junction I/CJ390 connected to it.

The identity of the thousands digit of the calling incoming junction's number stored in the storage bistable circuits $STe1$ to $STe4$ of the store STT will be extended to the line identifier LI (FIG. 1), details of which are not shown, through gating transistors $Tr140$ to $Tr143$ when the line identifier couples itself to the register REG. The identity of the hundreds digit of the calling incoming junction's number stored in the storage bistable circuits $SHe1$ to $SHe4$ will be extended to the line identifier via gating transistors $Tr144$ to $Tr147$, while the identity of the tens and units digit values of the incoming junction's number will be identified to the line identifier via gating transistors $Tr148$ to $Tr151$ and gating transistors $Tr152$ to $Tr155$. For the purpose of completely identifying the tens and units digit values, the gating transistors $Tr148$ and $Tr149$ and the four gating transistors $Tr152$ to $Tr155$ have their bases connected to negative potential over fixed strappings as shown. In order to gate the identities into the line identifier the gating transistors $Tr148$ to $Tr155$ will be primed by the application of earth potential to their commoned emitters. Thus, the line identifier LI will have identified to it from the register REG, via the gating transistors $Tr140$ to $Tr155$, the complete identity of the calling incoming junction's number.

Having now described how a free register, such as the registor REG, is taken into use in respect of a calling incoming junction, such as the incoming junction I/CJ390, and how the identity of this calling incoming junction is stored in the associated register, it is now convenient to describe the manner in which dialling on the calling incoming junction is supervised for the storage in the associated register of dialled digit values identifying the called line's number.

Figure 13A:
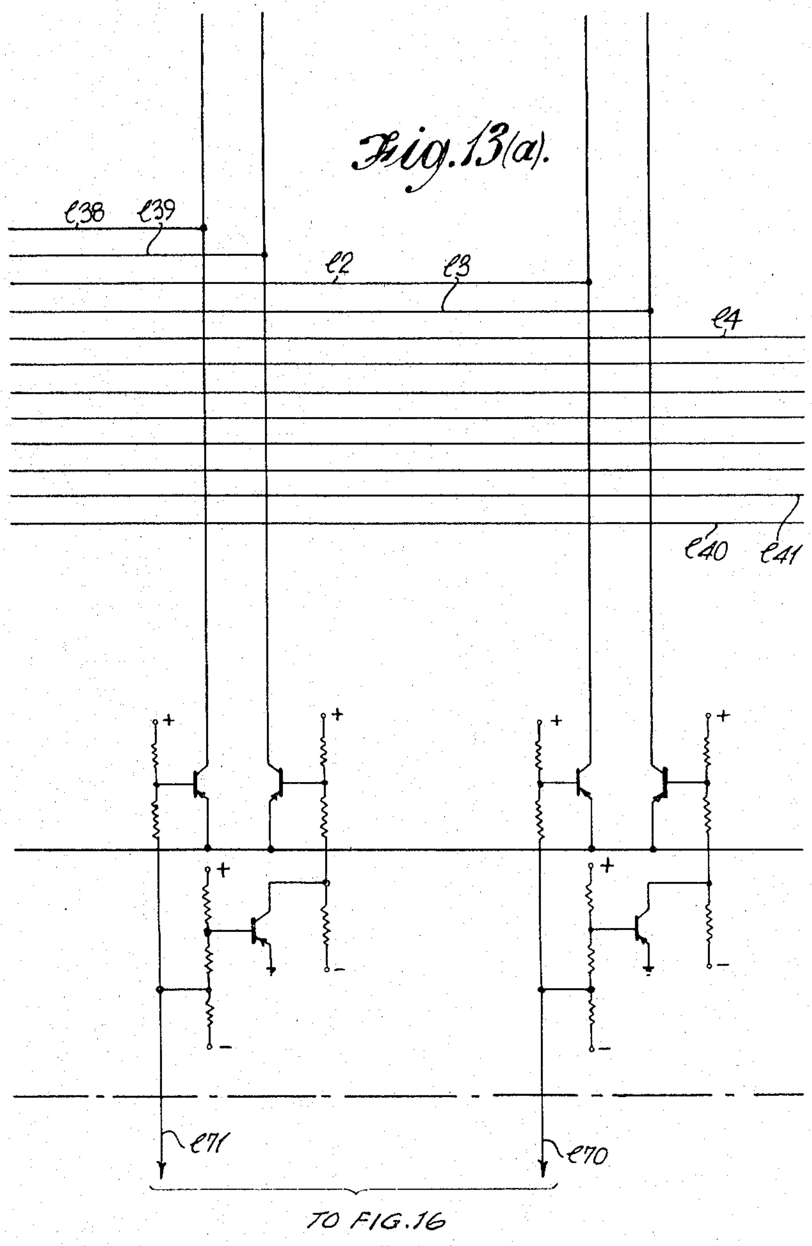
Figure 13B:
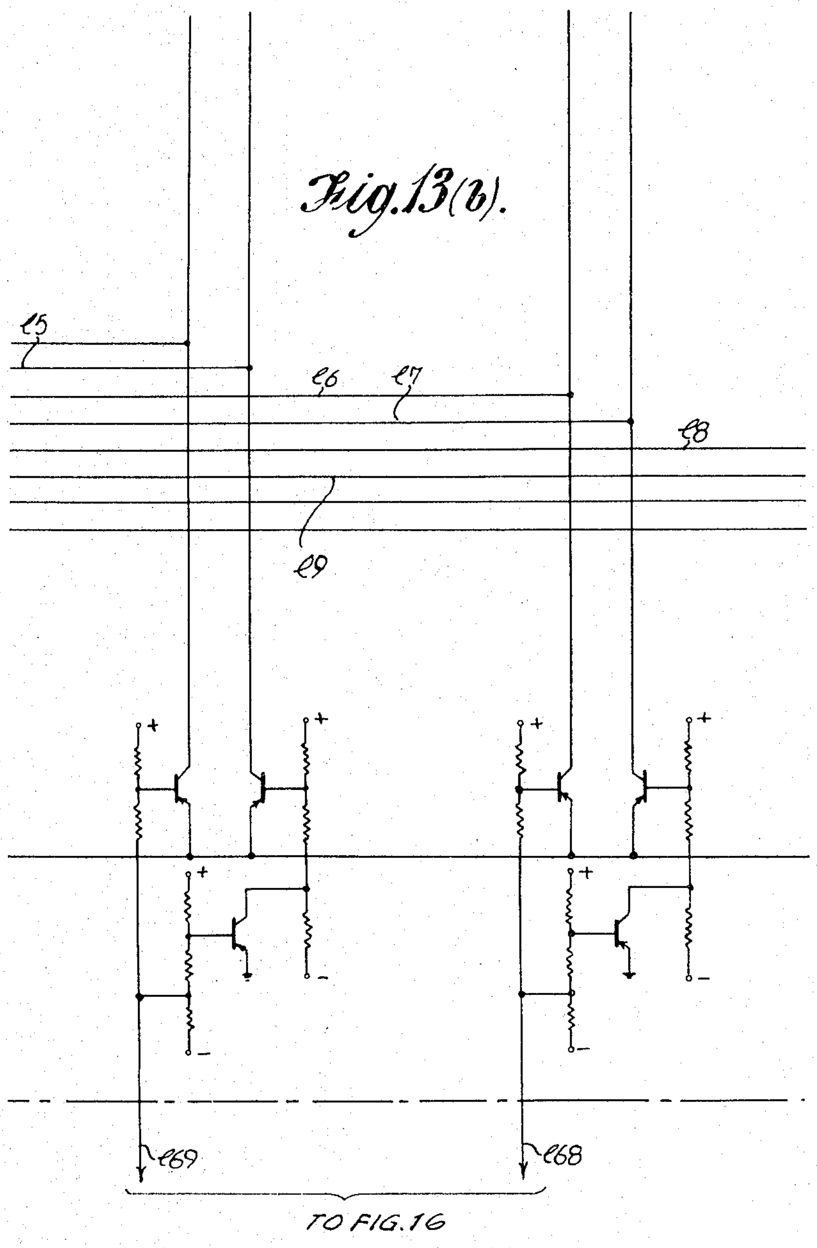
Figure 14:
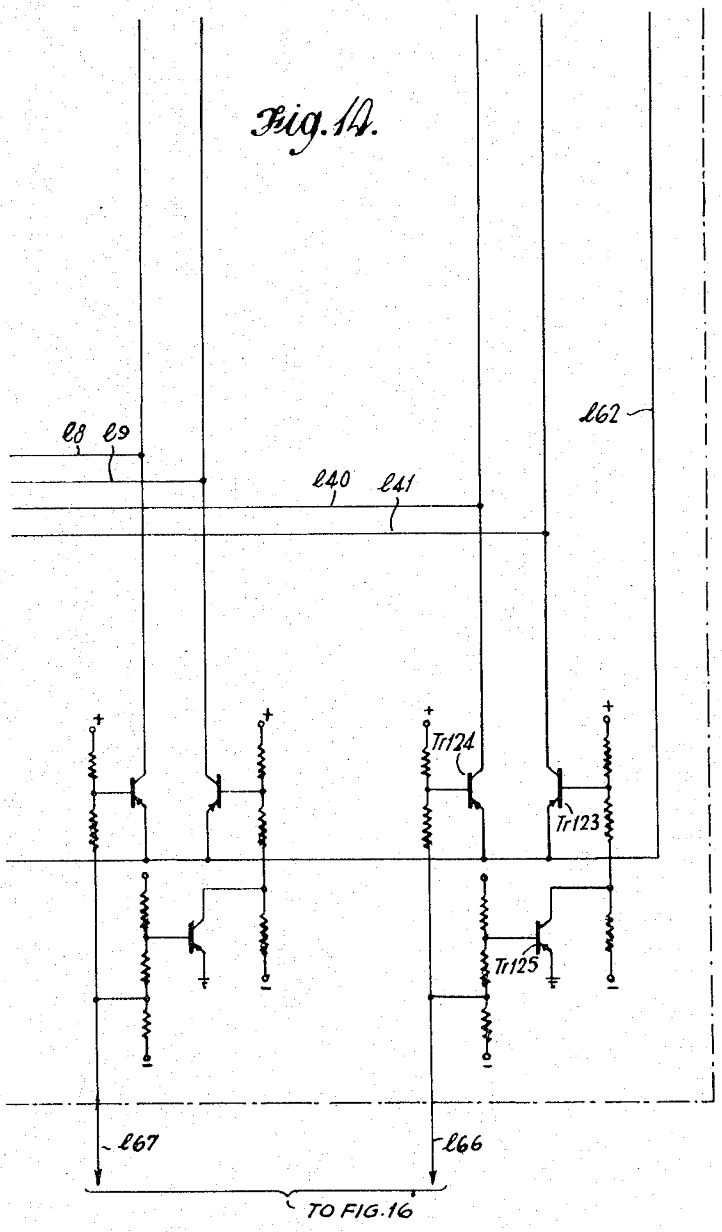

Referring to FIG. 3, the pulse leads $pl0$ to $pl39$ are connected, respectively, over leads, such as lead *l*78, to the pulse inputs of setting gates of respective register scan bistable circuits, such as the bistable circuit R*e* (FIG. 17) of the register REG. Still assuming that the calling incoming junction with which we are concerned is the incoming junction I/CJ390 (FIG. 3), it will be recalled that when the composite counter of the electronic scanner SC had its composite count position gated out on to the leads *l*2 to *l*9, *l*20 to *l*27 and *l*38 to *l*41 in response to the priming of transistors, such as transistors T*r*20 and T*r*21, the transistor T*r*75 was rendered conducting so as to apply an earth pulse to the pulse lead *pl*39. This positive pulse applied to the pulse lead *pl*39 was extended over lead *l*78 to the pulse input of the setting gate GS of the register scan bistable circuit R*e* (FIG. 17) of the register REG. As was described when the sequence counter was being considered, this bistable circuit R*e* was re-set by the earth pulse applied to lead *l*77 (also to lead *l*61) from the sequence counter when transistor T*r*106 was caused to conduct. The register scan bistable circuit R*e* is set by the earth pulse on lead *l*78 so that the left-hand transistor of this bistable circuit is rendered conducting, while the right-hand transistor of this bistable circuit is cut off. As a consequence, the transistor T*r*129 is rendered non-conducting, but at this point transistor T*r*128 remains conducting due to the negative potential applied to its base from the collector of the transistor T*r*109 of the sequence counter (FIG. 8). It will be recalled that so far the sequence counter has caused transistors T*r*106 to T*r*108 to conduct in turn to apply earth pulses to the leads *l*61 and *l*1, by which the register REG was seized and the identity of the calling incoming junction stored in it. The sequence counter now causes transistor T*r*109 to conduct in order to apply an earth pulse to the base of the transistor T*r*128 (FIG. 17) over lead *l*82 so as to render this transistor non-conducting. The earth pulse from the collector of transistor T*r*109 is also applied over lead *l*62 to the commoned emitters of the pairs of gating transistors, such as gating transistors T*r*123 and T*r*124 (FIG. 14), in order to prime these gating transistors. When transistor T*r*128 is cut off by the earth pulse on lead *l*82 from the sequence counter, the earth potential at the collector of this transistor is replaced by negative potential which is accordingly applied to the lead *l*76. This negative potential applied to lead *l*76 causes the transistor T*r*127 (FIG. 16) to conduct and in so doing it primes the group of ten gating transistors, such as transistor T*r*126, to enable markings corresponding to the set/re-set states of the bistable circuits of the decade stores STT and STH and the bistable circuits of the binary store STU to be gated on to the leads *l*66 to *l*75 (FIGS. 12 to 14). These markings applied to the leads *l*66 to *l*75 cause the pairs of gating transistors, such as transistors T*r*123 and T*r*124, to be operated in accordance with the markings applied to the leads *l*66 to *l*75, one transistor of each pair of gating transistors, such as transistor T*r*123, being rendered conducting while the other transistor, such as transistor T*r*124, remains cut off. Thus, markings corresponding to the identity of the calling incoming junction I/CJ390 are gated on to the leads *l*2 to *l*9, *l*20 to *l*27 and *l*38 to *l*41 via the gating transistors in the same way as corresponding markings were previously gated out on to these leads via the gating transistors, such as transistors T*r*20 and T*r*21, associated with the bistable circuits constituting the composite counter of the electronic scanner SC. These markings gated on to the leads bring about the conduction of the transistor T*r*75 (FIG. 10) and the transistor T*r*110 (FIG. 4). Transistor T*r*75 in conducting applies a pulse to the lead *pl*39 while transistor T*r*110 in conducting extends earth potential to the emitter of the transistor T*r*10 (FIG. 3) to prime this transistor. By this time, dialling will shortly be commenced on the calling incoming junction I/CJ390 and consequently the appertaining gating circuit, namely gating circuit G390, will still be open due to the looped condition of the line wires *w*1 and *w*2 of the calling incoming junction. Consequently, the earth pulse applied to the pulse lead *pl*39 and the pulse input of gating circuit G390 in response to the operation of transistor T*r*75 will pass through the open gating circuit G390 on to the pulse lead *pl*40 to cause the transistor T*r*0 to be cut off, and in so doing negative potential will be applied to the primed transistor T*r*10 which will accordingly conduct and an earth pulse will be applied to the pulse path PH connected to the pulse inhibit circuit PI. This earth pulse applied to the pulse inhibit circuit PI is applied to the base of normally conducting transistor T*r*120 to render this transistor non-conducting, but the transistor T*r*122 will be maintained non-conducting due to the earth potential applied to its base over lead *l*63 from the collector of the transistor T*r*134, which it will be remembered was rendered conducting when the information concerning the identity of the calling incoming junction had been stored in the stores STT, SHT and STU of the register REG. Thus, a positive pulse is prevented from being applied to the lead *l*64 to take a further register into use. The earth pulse received by the pulse inhibit circuit PI from the pulse path PH causes transistor T*r*121 to be cut off and by so doing it applies a negative pulse to the lead *l*65 which is connected to the base of the transistor T*r*138 (FIG. 17). It will be recollected that when the pulse was applied from the sequence counter to the base of the transistor T*r*128 over lead *l*82, transistor T*r*128 was cut off so that transistor T*r*129 also being cut off when the register scan bistable circuit R*e* was set by the pulse applied to the lead *pl*39 (FIG. 3) negative potential was applied to the base of transistor T*r*139. This transistor is thus conducting at this juncture as a consequence of which the transistor T*r*138 is primed by the earth potential applied to its emitter. Thus, the negative potential applied to the base of transistor T*r*138 from the pulse inhibit circuit PI will cause this transistor to conduct. In conducting, this transistor T*r*138 extends from its collector an earth pulse over the lead *l*81 to the pulse input of a setting gate GS associated with a dialling supervisory bistable circuit DIA*e* (FIG. 15) so that a setting pulse for the bistable ciriuit DIA*e* is produced each time the sequence counter delivers an output pulse in response to the conduction of tse transistor T*r*109 coincident with the line wires *w*1 and *w*2 being in the looped condition. This bistable circuit DIA*e* also has a re-setting gate GR associated with it, the pulse input of which is connected over lead *l*60 to the collector of the transistor T*r*107 (FIG. 8) so that a re-setting pulse for the bistable circuit DIA*e* is produced each time the sequence counter delivers an output pulse in response to the conduction of the transistor T*r*107. The earth pulse applied to the pulse input of the setting gate GS of the bistable circuit DIA*e* causes this circuit to be set so that the left-hand transistor which conducts in the re-set state of the bistable circuit is rendered non-conducting whilst the right-hand transistor of this bistable circuit will be rendered conducting. The collectors of the left-hand and right-hand transistors of the bistable circuit DIA*e* are connected, respectively, to the bias inputs of setting and re-setting gates GS and GR associated with a further bistable circuit DX*e*. The pulse inputs of the setting and re-setting gates GS and GR of the bistable circuit DX*e* are connected together and connected to the lead *l*60 over which earth pulses are applied from the transistor T*r*107 in the sequence counter. The collectors of the left-hand and right-hand transistors of the bistable circuits DX*e* are connected via capacitors to the bases of respective transistors T*r*156 and T*r*157 as well as to the bias inputs of two pulse-plus-bias gates G401 and G402. The bias input of the pulse-plus-bias gate G402 which is connected to the collector of the left-hand transistor of the bistable circuit DX*e* is connected to the base of a normally non-conducting transistor T*r*160 having its collector connected to a receiving counter (not shown) in the register REG comprising four bistable circuits having setting and re-setting gates associated therewith and suitably modified to have a cyclic count of ten. The collectors of the two normally non-conducting transistors T*r*156 and T*r*157 are connected together and connected to the base of a normally conducting transistor T*r*161 having its collector connected to the base of a normally non-conducting transistor T*r*162 with the emitters of these two transistors T*r*161 and T*r*162 being connected in common. The base of the transistor T*r*161 is connected to earth via a capacitor. These two transistors T*r*161 and T*r*162 constitute a trigger circuit responsive to positive pulses applied to the base of the transistor T*r*161 from the commoned collector circuits of the transistors T*r*156 and T*r*157 so that the transistor T*r*161 will be cut off by the first positive pulse of a train of such pulses, while the transistor T*r*162 will conduct. This trigger circuit once it responds will only restore to its initial state, namely with transistor T*r*161 conducting and transistor T*r*162 non-conducting, at the end of the train of pulses applied to the base of the transistor T*r*161. This holding of the trigger circuit between successive pulses of the train of pulses is due to the time constant of the discharge circuit for the capacitor connected to the base of the transistor T*r*161. The collector of the transistor T*r*162 is connected to the pulse inputs of the gating circuits G401 and G402. The pulse outputs of these gates are connected, respectively, via capacitors to the bases of two normally non-conducting transistors T*r*158 and T*r*159. The collector of the transistor T*r*158 is connected over a lead *l*83 to the bias input of the re-setting gate GR associated with the busy/free bistable circuit BF*e* (FIG. 17) in the register REG. The collector of the transistor T*r*159 is connected to a circuit arrangement not shown for causing transfer of a digit counted into the receiving counter to a digit store comprising four bistable circuits selected under the control of a digit store distributor and for stepping this distributor so that the next transfer of a digit counted into the receiving counter is effected into a further digit store comprising four bistable circuits.

It will be remember that the line wires *w*1 and *w*2 of the calling junction were found to be looped and consequently on earth pulse was received over the lead *l*81 from the collector of transistor T*r*138 (FIG. 17) in order to set the dialling supervisory bistable circuit DIA*e* (FIG. 18) so that the left-hand transistor of this bistable circuit is now non-conducting while the right-hand transistor of this bistable circuit is conducting. Thus, the bias input of the re-setting gate GR associated with the bistable circuit DX*e* has positive potential applied to it so that the next positive pulse received over the lead *l*60 from the collector of transistor T*r*107 (FIG. 8) will cause the right-hand transistor of the bistable circuit DX*e* to be rendered non-conducting and the left-hand transistor of this bistable circuit to conduct. The sequence counter next removes the earth pulse from the leads *l*82 and *l*62 (FIG. 8) which caused the register REG to be interrogated and the next pulse from the counter will be applied to the lead *l*61 by the conduction of the transistor T*r*106, whereupon the composite counter of the electronic scanner SC will be stepped to its next count position. At the next step of the sequence counter, an earth pulse applied to the lead *l*60 from the collector of transistor T*r*107 causes the left-hand transistor of the bistable circuit DX*e* to conduct and the right-hand transistor of this circuit to be cut off. Also, the bistable circuit DIA*e* is re-set by this earth pulse on lead *l*60. Thus, the bias input of the setting gate GS associated with the bistable circuit DX*e* has positive potential applied to it. When the transistor T*r*108 conducts, markings corresponding to the new count position of the composite counter will be extended to the leads *l*2 to *l*9, *l*20 to *l*27 and *l*38 to *l*41 to cause one of the transistors T*r*36 to T*r*74 to conduct and one of the transistors T*r*110 to T*r*119 to conduct. Thus, a positive pulse will be applied to one of the pulse leads *pl*0 to *pl*38 whilst one of the transistors T*r*10 to T*r*19 will be primed in response to the earth potential applied to its emitter from the conducting transistor of the transistors T*r*110 to T*r*119. In consequence, one of the gating circuits G000 to G389 will be scanned by the electronic scanner SC to determine whether that gating circuit is in a calling condition and subsequently the register connected with the pulsed lead of the pulse leads *pl*0 to *pl*38 will be interrogated as described for the register REG. In response to the conduction of transistor T*r*109 of the sequence counter, markings will be gated out on to the scanning leads.

The electronic scanner SC continuously scans the gating circuits in turn in response to scanning pulses applied in turn to the pulse leads *pl*0 to *pl*39 in respect of each priming of one of the gating transistors T*r*10 to T*r*19. When the pulse lead *pl*39 receives a scanning pulse for the second time, the pulse will be extended over lead *l*78 to the setting gate of the register scan bistable circuit R*e* in the register REG, whereupon the sequence of operations already described for determining whether the calling incoming junction I/CJ390 having its identity stored in the register REG is in a looped or disconnected condition for the purposes of supervising dialling will be repeated. The line wires *w*1 and *w*2 of this incoming junction may now be looped or disconnected if dialling has commenced. If the line wires *w*1 and *w*2 are looped, then a further earth pulse applied to the lead *l*81 will be received at the pulse input of the setting gate GS of the re-set bistable circuit DIA*e* contemperaneously with the conduction of T*r*109. The bistable circuit DIA*e* will again be set by this pulse so that the right-hand transistor conducts, thus making the resetting GR gate of bistable circuit DX*e* conductive. Bistable circuit DX*e* was, however, set by the previous pulse received on the lead *l*60 so that its right-hand transistor is cut off, therefore when the next pulse appears on the lead *l*60 bistable circuit DIA*e* will be reset by this pulse but bistable circuit DX*e* will remain in the previously set condition. If, however, the line wires *w*1 and *w*2 of the junction I/CJ390 are disconnected due to the occurrence of a break impulse on the incoming junction, then no earth pulse will be received at the pulse input of the setting gate GS of the bistable circuit DIA*e* coincided with the conduction of transistor T*r*109, and the state of the bistable circuits DIA*e* and DX*e* remains unchanged. The setting gate GS and the left-hand transistor of the bistable circuit DX*e* will therefore be conducting.

The bistable circuit DX*e* will be restored to its initial state (i.e., right-hand transistor conducting) when the next earth pulse is received over line *l*60 coincident with transistor T*r*107 conducting. Each time the right-hand transistor of the bistable circuit DX*e* conducts, a negative pulse is applied from the collector of the left-hand transistor of this circuit to the base of the transistor T*r*160 to cause this transistor to conduct and thereby apply an earth pulse to the receiving counter (not shown) to cause this step. At the commencement of the first train of dialled impulses received on the incoming junction I/CJ390 transistor T*r*161 is cut off while the transistors T*r*162 of the trigger circuit conducts. As successive pulses are delivered to the pulse lead *pl*39 (FIG. 3) to effect successive interrogations of the register REG, the bistable circuit DX*e* (FIG. 15) will be alternately set and re-set producing pulse operation of the transistors T*r*156 to T*r*157 having their bases connected, respectively, to the left-hand and right-hand transistors of the bistable circuit DX*e*. This pulse operation of the bistable circuit DX*e* causes the transistor T*r*160 to pulse and thereby extend pulses to the receiving counter. During such pulse operation of circuit DX*e*, the trigger circuit constituted by the transistors Tr161 and Tr162 is maintained in its set state until the end of the first train of impulses received on the calling incoming junction I/CJ390, whereupon the trigger circuit restores to its initial state so that a negative pulse is applied from the collector of the transistor T*r*162 to the pulse inputs of the gating circuits G401 and G402. If the next interrogations of the register REG by a pulse on lead pl39 indicates that there is a prolonged loop on the line wires *w*1 and *w*2 of this junction, then the gate G402 will be opened due to the potential applied to its bias input from the collector of the left-hand transistor of the bistable circuit DX*e* so that the negative-going pulse from the collector of the transistor T*r*162, as the trigger circuit restores at the end of the train of impulses, will pass through the gate G402 to cause transistor T*r*159 to conduct and so extend an earth pulse from its collector to cause the receiving counter to transfer the information it has counted in into the first digit store and to cause the receiving distributor to step in order to allocate the next digit store for receiving the next dialled digit to be counted in by the receiving counter.

If, however, the line wires *w*1 and *w*2 of the calling incoming junction are found to be disconnected on successive interrogations indicating that the calling junction has been released, then the gate G401 will be opened by the negative potential applied to its bias input from the collector of the right-hand transistor of the bistable circuit DX*e* so that the negative-going pulse extended to the pulse input of this gate from the collector of transistor T*r*162 will pass through the gate G401 to cause the transistor T*r*158 to conduct, thereby applying a pulse over the lead *l*83 to the pulse input of the re-setting gate GR of the busy/free bistable circuit BF*e* (FIG. 17) thus causing the bistable circuit to be re-set and to extend a potential to the register one-only selector to indicate that the register is now free. At the same time, the storage bistable circuits of the stores STT, STH and STU of the register will be cleared by re-setting pulses fed to re-setting gates (not shown) associated with these storage bistable circuits.

Assuming, however, that dialling proceeds normally on the incoming junction I/CJ390, then the dialled digits will be stored in the respective digit stores associated with the receiving counter. When dialling has been completed then the register REG has stored within it the identity of the calling incoming junction's number and the identity of the calling incoming junction's number and the identity of an outgoing junction relay set if required and markings corresponding to these identities can be gated into the line identifier for the establishment of a through connection between the calling incoming junction and the called line when the register REG is coupled up to the line identifier under the control of a register scanner (not shown). The call may then be set up in the same manner as particularly described in co-pending United States application No. 122,137, to which attention is hereby directed, in which exchange equipment is better utilised so that economies in such equipment can be achieved for a given grade of service, or such grade of service can be improved, by the sectionalisation of the exchange.

Although no provision for extending busy tone to the calling incoming junction in the event of register congestion has been shown in the drawings, it is envisaged that each incoming junction relay set, such as the junction relay set RS390, may be provided with a relay which can be operated by a suitable register scanner so as to extend busy tone to the calling junction on register congestion.

What I claim is:

1. An automatic telephone exchange system comprising an exchange, lines connected to said exchange, incoming junctions included in said lines, incoming junction relay sets terminating said incoming junctions and individual to said junctions, registers to which access can be afforded to calling incoming junctions for the purpose of storing the identities of calling incoming junctions and called lines' numbers, electronic scanning means for producing scanning pulses, gating circuits associated, respectively, with incoming junctions and to which scanning pulses are fed in succession from said electronic scanning means, and common signal path means to which signals are transmitted when said gating circuits are conditioned to permit of the passage therethrough of said scanning pulses in the looped condition of their appertaining incoming junctions, initially for the seizure of a free register which registers the identity of the appertaining calling incoming junction and, subsequently, for the supervision and counting in the seized register of dialled impulses received over the calling incoming junction for registering the called line's identity in the seized register.

2. An automatic telephone exchange system as claimed in claim 1 comprising a sequence counter for controlling the scanning by the electronic scanning means so that the time period between successive scanning pulses fed to gating circuits associated with incoming junctions for the supervision and counting of dialled impulses is less than the time period of a dialled impulse.

3. An automatic telephone exchange system comprising an exchange, lines connected to said exchange, incoming junctions included in said lines, incoming junction relay sets terminating said incoming junctions and individual to said junctions, registers to which access can be afforded to calling incoming junctions for the purpose of storing the identities of calling incoming junctions and called lines' numbers, electronic scanning means for producing scanning pulses, gating circuits associated, respectively, with incoming junctions and to which scanning pulses are fed in succession from said electronic scanning means, common signal path means to which signals are transmitted when said gating circuits are conditioned to permit of the passage therethrough of said scanning pulses to bring about the transmission of signals in the looped condition of their appertaining incoming junctions, initially for the seizure of a free register which registers the identity of the appertaining calling incoming junction and, subsequently, for the supervision and counting in the seized register of dialled impulses received over the calling incoming junction for registering the called line's identity in the seized register, means for extending the identity of an incoming junction associated with a gating circuit being scanned at a given instant from said scanning means to said registers in common and means in said registers for comparing said identity with the identity of any incoming junction already stored therein, any response of a register as a result of the comparison determining whether a register has already been taken into use for dealing with the initiation of a call on the appertaining incoming junction.

4. An automatic telephone exchange system as claimed in claim 3, in which the registers comprise a number of storage elements for storing the identity of a calling incoming junction and a number of comparator elements associated with said storage elements and arranged to respond to markings extended to them from the electronic scanning means so as to identify incoming junctions being scanned, means being provided for extending an inhibiting pulse to the pulse inhibit circuit to prevent seizure of a register if conformity exists between the setting of the storage elements and the comparator elements in any of the registers, thereby indicating that a register has already been taken into use for the call.

5. An automatic telephone exchange system as claimed in claim 3, in which pulse signals are transmitted to the common signal path means.

6. An automatic telephone exchange system as claimed in claim 5, comprising means for rendering a register capable of receiving impulses corresponding to dialled impulses once the register has been seized by a signal initially transmitted to it over the common signal path means.

7. An automatic telephone exchange system as claimed in claim 6, in which each of the registers include means for counting dialled impulses received over a calling incoming junction to which the register is afforded access, and in which the scanning pulses fed to the respective gating circuits in turn by the electronic scanning means serve for the supervision of dialling on calling incoming junctions by controlling the operation of the dial impulse counting means as well as for detecting the initiation of incoming junction calls.

8. An automatic telephone exchange system as claimed in claim 7, including connection means for feeding the scanning pulses in sequence to the registers, and in which each of the registers include means responsive to receipt of said scanning pulses to cause it to identify to the electronic scanning means the identity of a calling incoming junction for which the register has been taken into use.

9. An automatic telephone exchange system as claimed in claim 8, in which as a consequence of scanning of a register which has already been seized by a pulse delivered to it over the common signal path means in response to the passage of a scanning pulse through the appropriate gating circuit so that said register identifies to the electronic scanning means the identity of the calling incoming junction afforded access to said register a pulse is fed by the electronic scanning means to that gating circuit corresponding to the calling incoming junction whose identity is stored within the register being scanned and the pulsed gating circuit permits or inhibits the passage of such pulse so that a pulse will be transmitted to the register or such pulse will be withheld from said register according to whether the calling incoming junction is looped or disconnected at the instant of scanning of the gating circuit, and in which successive pulses fed to the appropriate gating circuit during successive intervals between pulses fed to the gating circuits in turn by the electronic scanning means to detect the initiation of calls rather than the supervision of dialling over calling incoming junctions and produced by the electronic scanning means in response to pulse scanning of the register concerned are utilised in the detection of dialled impulses received over the calling incoming junction and the transmission of corresponding pulses to the register for dial impulse counting and storing purposes.

10. An automatic telephone exchange system as claimed in claim 9, comprising a pulse inhibit circuit to which the common pulse path means extends, dual paths on the outgoing side of said pulse inhibit circuit and extending in common to the registers and means for selecting one or other of the two paths, whereby a free register can be seized by a pulse received over one of said dual paths from the outgoing side of the pulse inhibit circuit in response to scanning of the gating circuits in turn by the electronic scanning means for detecting the initiation of calls on incoming junctions, and in which pulses can be delivered to seized registers over the other of said dual paths during scanning of the gating circuits for the purposes of supervising dialling on incoming junctions and the counting and storing in the register of dialled impulses.

No references cited.

KATHLEEN H. CLAFFY, *Primary Examiner.*

WILLIAM C. COOPER, *Assistant Examiner.*